US012565284B2

(12) United States Patent
Shahana et al.

(10) Patent No.: US 12,565,284 B2
(45) Date of Patent: Mar. 3, 2026

(54) CONTROL DEVICE FOR HUMAN-POWERED VEHICLE

(71) Applicant: Shimano Inc., Osaka (JP)

(72) Inventors: Satoshi Shahana, Osaka (JP); Hitoshi Takayama, Osaka (JP)

(73) Assignee: Shimano Inc., Osaka (JP)

( * ) Notice: Subject to any disclaimer, the term of this patent is extended or adjusted under 35 U.S.C. 154(b) by 1096 days.

(21) Appl. No.: 17/547,360

(22) Filed: Dec. 10, 2021

(65) Prior Publication Data

US 2022/0204129 A1    Jun. 30, 2022

(30) Foreign Application Priority Data

Dec. 28, 2020    (JP) ................................. 2020-219528

(51) Int. Cl.
    *B62M 6/50*        (2010.01)
    *B62J 45/415*      (2020.01)
    B62M 9/14          (2006.01)

(52) U.S. Cl.
    CPC ............ *B62M 6/50* (2013.01); *B62J 45/4152* (2020.02); *B62M 9/14* (2013.01)

(58) Field of Classification Search
    CPC .......... B62M 6/50; B62M 9/14; B62M 25/08; B62M 6/40; B62M 6/45; B62J 45/4152; B62J 45/413
    See application file for complete search history.

(56) References Cited

U.S. PATENT DOCUMENTS

| | | | | |
|---|---|---|---|---|
| 11,091,225 | B2 * | 8/2021 | Deleval | .................... B62M 6/55 |
| 12,097,928 | B2 * | 9/2024 | Nakamura | ............... B62J 50/22 |
| 2017/0057596 | A1 * | 3/2017 | Ichida | .................... B62K 25/00 |
| 2018/0118211 | A1 * | 5/2018 | Tsuchizawa | .......... B60W 10/08 |
| 2018/0215432 | A1 * | 8/2018 | Tsuchizawa | ............. B62M 6/50 |
| 2018/0354582 | A1 | 12/2018 | Ichida et al. | |
| 2018/0354583 | A1 | 12/2018 | Ichida et al. | |

(Continued)

FOREIGN PATENT DOCUMENTS

| | | |
|---|---|---|
| CN | 109969336 A | 7/2019 |
| CN | 110316309 A | 10/2019 |
| CN | 111942513 A | 11/2020 |

(Continued)

*Primary Examiner* — Valentin Neacsu
*Assistant Examiner* — Marlon A Arce
(74) *Attorney, Agent, or Firm* — Spencer Fane, LLP

(57)    ABSTRACT

A control device for a human-powered vehicle has an electronic controller that controls a motor that applies a propulsion force to the human-powered vehicle to assist a human driving force. The human-powered vehicle includes a transmission device. The electronic controller is configured to assist in propulsion of the human-powered vehicle with the motor in a state in which the human-powered vehicle is propelled by the human driving force. In a case where a transmission ratio of the transmission device is changed, the electronic controller decreases an assist level of the motor in accordance with the human driving force input to the human-powered vehicle, and controls the motor so that the assist level is greater for a case where the human driving force is a first human driving force than the assist level for a case where the human driving force is less than the first human driving force.

19 Claims, 11 Drawing Sheets

(56) References Cited

U.S. PATENT DOCUMENTS

| | | | |
|---|---|---|---|
| 2021/0284278 A1* | 9/2021 | Wada ..................... | B62J 45/20 |
| 2021/0300499 A1 | 9/2021 | Tsuchizawa et al. | |

FOREIGN PATENT DOCUMENTS

| | | |
|---|---|---|
| DE | 10 2013 220 541 A1 | 4/2015 |
| DE | 10 2016 000 182 A1 | 7/2016 |
| DE | 10 2017 205 675 A1 | 10/2017 |
| JP | 2014-151745 A | 8/2014 |
| JP | 2017-43322 A | 3/2017 |
| JP | 2018-70001 A | 5/2018 |
| JP | 2018-122666 A | 8/2018 |
| JP | 2020-90109 A | 6/2020 |
| JP | 2020-142605 A | 9/2020 |

* cited by examiner

CONTROL DEVICE FOR HUMAN-POWERED VEHICLE

CROSS-REFERENCE TO RELATED APPLICATIONS

This application claims priority to Japanese Patent Application No. 2020-219528, filed on Dec. 28, 2020. The entire disclosure of Japanese Patent Application No. 2020-219528 is hereby incorporated herein by reference.

BACKGROUND

Technical Field

The present disclosure generally relates to a human-powered vehicle control device for a human-powered vehicle.

Background Information

Japanese Laid-Open Patent Publication No. 2014-151745 (Patent Document 1) discloses an example of a control device for a human-powered vehicle. In a state where propulsion of the human-powered vehicle is assisted by a riding assist electric motor, in a case where the transmission ratio of a transmission device is changed, the control device decreases output of the riding assist electric motor in accordance with a human driving force.

SUMMARY

According to Patent Document 1, load applied to the transmission device is decreased to facilitate shifting of the transmission device. However, the rider can feel that the assist force is insufficient.

One object of the present disclosure is to provide a control device for a human-powered vehicle that controls the motor, which applies a propulsion force to the human-powered vehicle, so that shifting of a transmission device is facilitated while the rider is less likely feel that the assist force is insufficient in a case where the transmission ratio of a transmission device is changed.

A control device in accordance with a first aspect of the present disclosure is for a human-powered vehicle. The control device comprises an electronic controller configured to control a motor that applies a propulsion force to the human-powered vehicle. The human-powered vehicle includes the motor and a transmission device for assisting a human driving force. The electronic controller is configured to assist in propulsion of the human-powered vehicle with the motor in a state in which the human-powered vehicle is propelled by the human driving force. In a case where a transmission ratio of the transmission device is changed, the electronic controller is configured to decrease an assist level of the motor in accordance with the human driving force input to the human-powered vehicle, and is configured to control the motor so that the assist level is greater for a case where the human driving force is a first human driving force than the assist level for a case where the human driving force is a second human driving force that is less than the first human driving force. With the control device according to the first aspect, in a case where the transmission ratio of the transmission device is changed, the assist level of the motor is decreased in accordance with the human driving force. This facilitates the shifting of the transmission device. With the control device according to the first aspect, in a case where the transmission ratio of the transmission device is changed, the assist force will not be drastically changed. Thus, the rider is less likely to feel that the assist force is insufficient.

In accordance with a second aspect of the present disclosure, the control device according to the first aspect is configured so that the assist level includes a ratio of an assist force of the motor to the human driving force. The control device according to the second aspect changes the assist level by changing the ratio of the assist force of the motor to the human driving force.

In accordance with a third aspect of the present disclosure, the control device according to the first or second aspect is configured so that the assist level includes a restriction level that restricts changes in an output of the motor in a case where the output of the motor decreases. The control device according to the third aspect changes the assist level by changing the restriction level, which restricts changes in output of the motor, in a case where the output of the motor is decreased.

In accordance with a fourth aspect of the present disclosure, the control device according to any one of the first to third aspects is configured so that the electronic controller is configured to increase the assist level in a case where a predetermined period elapses after the assist level has decreased. The control device according to the fourth aspect increases the assist level in a case where the predetermined period elapses after the assist level is decreased. This eliminates the need for an operation of the rider for increasing the assist level, thereby improving convenience.

In accordance with a fifth aspect of the present disclosure, the control device according to any one of the first to fourth aspects is configured so that the electronic controller is configured to increase the assist level upon completion of the transmission ratio being changed. The control device according to the fifth aspect increases the assist level in a case where changing of the transmission ratio is completed. This eliminates the need for an operation of the rider for increasing the assist level, thereby improving convenience.

In accordance with a sixth aspect of the present disclosure, the control device according to the fourth aspect is configured so that the predetermined period includes a period during which a rotation amount of a wheel of the human-powered vehicle becomes a predetermined rotation amount. The predetermined rotation amount is greater than or equal to 30 degrees and less than 460 degrees. The control device according to the sixth aspect increases the assist level after the period during which the rotation amount of the wheel of the human-powered vehicle becomes a rotation amount that is greater than or equal to 30 degrees and less than 460 degrees. This eliminates the need for an operation of the rider for increasing the assist level, thereby improving convenience.

In accordance with a seventh aspect of the present disclosure, the control device according to any one of the first to sixth aspects is configured so that in a case where the electronic controller decreases the assist level, the electronic controller is configured to decrease the assist level in accordance with the transmission ratio. With the control device according to the seventh aspect, the electronic controller controls the motor at the assist level corresponding to the transmission ratio.

In accordance with an eighth aspect of the present disclosure, the control device according to the seventh aspect is configured so that the electronic controller is configured to decrease the assist level so that the assist level is greater for a case where the human driving force is a third human driving force and the transmission ratio is less than a first transmission ratio than the assist level for a case where the human driving force is the third human driving force and the transmission ratio is greater than or equal to the first transmission ratio. With the control device according to the eighth aspect, at a relatively small transmission ratio, changes in the assist level are restricted more than at a relatively large transmission ratio. Thus, the rider is less likely to feel that the assist force is insufficient particularly in a case where the human-powered vehicle is traveling at a low speed.

In accordance with a ninth aspect of the present disclosure, the control device according to any one of the first to eighth aspects is configured so that in a case where the electronic controller decreases the assist level, the electronic controller is configured to decrease the assist level in accordance with a gradient of a road on which the human-powered vehicle is traveling. With the control device according to the ninth aspect, the electronic controller controls the motor at the assist level corresponding to the gradient of the road on which the human-powered vehicle is traveling.

In accordance with a tenth aspect of the present disclosure, the control device according to the ninth aspect is configured so that the electronic controller is configured to decrease the assist level so that the assist level is greater for a case where the human driving force is a fourth human driving force and the gradient is greater than or equal to a first gradient than the assist level for a case where the human driving force is the fourth human driving force and the gradient is less than the first gradient. With the control device according to the tenth aspect, in a case where the gradient is relatively large, changes in the assist level are restricted more than in a case where the gradient is relatively small. Thus, the rider is less likely to feel that the assist force is insufficient in a case where the human-powered vehicle is traveling on a slope.

In accordance with an eleventh aspect of the present disclosure, the control device according to any one of the first to tenth aspects is configured so that in a case where the electronic controller decreases the assist level, the electronic controller is configured to decrease the assist level in accordance with a pitch angle of the human-powered vehicle. The control device according to the eleventh aspect, the electronic controller controls the motor at the assist level corresponding to the pitch angle of the human-powered vehicle.

In accordance with a twelfth aspect of the present disclosure, the control device according to the eleventh aspect is configured so that the electronic controller is configured to decrease the assist level so that the assist level is greater for a case where the human driving force is a fourth human driving force and the pitch angle is greater than or equal to a first pitch angle than the assist level for a case where the human driving force is the fourth human driving force and the pitch angle is less than the first pitch angle. With the control device according to the twelfth aspect, in a case where the pitch angle is relatively large, changes in the assist level are restricted more than in a case where the pitch angle is relatively small. Thus, the rider is less likely to feel that the assist force is insufficient in a case where the human-powered vehicle is traveling on a slope.

In accordance with a thirteenth aspect of the present disclosure, the control device according to any one of the first to twelfth aspects is configured so that the electronic controller is configured to maintain the assist level in a case where the transmission ratio of the transmission device is changed and the human driving force is less than a predetermined human driving force. In a case where human driving force is relatively small, human driving force acting on the transmission device and assist force of the motor acting on the transmission device are relatively small, so that the transmission device can readily perform shifting without decreasing the assist level. Thus, the control device according to the thirteenth aspect reduces the processing load on the electronic controller.

In accordance with a fourteenth aspect of the present disclosure, the control device according to any one of the first to thirteenth aspects is configured so that in a case where the electronic controller decreases the assist level, the electronic controller is configured to gradually decrease the assist level. With the control device according to the fourteenth aspect, in a case where the assist level is decreased, the assist level is gradually decreased. Thus, the rider is less likely to feel awkward.

In accordance with a fifteenth aspect of the present disclosure, the control device according to any one of the first to fourteenth aspects is configured so that the human-powered vehicle includes a crank to which human driving force is input. In a case where the transmission ratio of the transmission device is changed, the electronic controller is configured to start a process for decreasing the assist level in a case where an angle of the crank is in a predetermined range. In a case where the transmission ratio of the transmission device is changed, the control device according to the fifteenth aspect starts a process for decreasing the assist level in a case where the crank is set to an appropriate angle. This further facilitates shifting of the transmission device.

In accordance with a sixteenth aspect of the present disclosure, the control device according to any one of the first to fifteenth aspects is configured so that the transmission device includes a derailleur and sprockets aligned along a rotation axis. In a case where the transmission ratio of the transmission device is changed, the electronic controller is configured to decrease the assist level at least during a period in which the sprockets are rotated by a predetermined angle. In a case where the transmission ratio of the transmission device is changed, the control device according to the sixteenth aspect decreases the assist level at least during the period in which the sprockets are rotated by the predetermined angle. This further facilitates shifting of the transmission device.

In accordance with a seventeenth aspect of the present disclosure, the control device according to any one of the first to sixteenth aspects is configured so that in a case where the electronic controller decreases the assist level of the motor, the electronic controller is configured to start a process for decreasing the assist level of the motor in accordance with a state of a shifting action of the transmission device. The control device according to the seventeenth aspect starts a process for decreasing the assist level of the motor in accordance with the state of a shifting action of the transmission device. Thus, the electronic controller decreases the assist level of the motor at timing suitable for the shifting action of the transmission device.

In accordance with an eighteenth aspect of the present disclosure, the control device according to any one of the first to seventeenth aspects is configured so that the electronic controller is configured to decrease the assist level in accordance with the human driving force input to the human-powered vehicle in only one of a case where the transmission ratio is increased and a case where the transmission ratio is decreased. The control device according to the eighteenth aspect reduces the processing load on the electronic controller.

In accordance with a nineteenth aspect of the present disclosure, the control device according to any one of the first to eighteenth aspects is configured so that in a case where the electronic controller controls the transmission device to change the transmission ratio of the transmission device, the electronic controller is configured to start a shifting action with the transmission device in a case where the human driving force decreases. The control device according to the nineteenth aspect starts a shifting action of the transmission device in accordance with a decrease in human driving force in a case where the transmission ratio of the transmission device is changed. This facilitates shifting of the transmission device.

The human-powered vehicle control device of the present disclosure controls the motor, which applies propulsion force to the human-powered vehicle, so that shifting of the transmission device is facilitated while the rider is less likely to feel that the assist force is insufficient in a case where the transmission ratio of the transmission device is changed.

BRIEF DESCRIPTION OF THE DRAWINGS

Referring now to the attached drawings which form a part of this original disclosure.

DETAILED DESCRIPTION OF EMBODIMENTS

Figure 1:
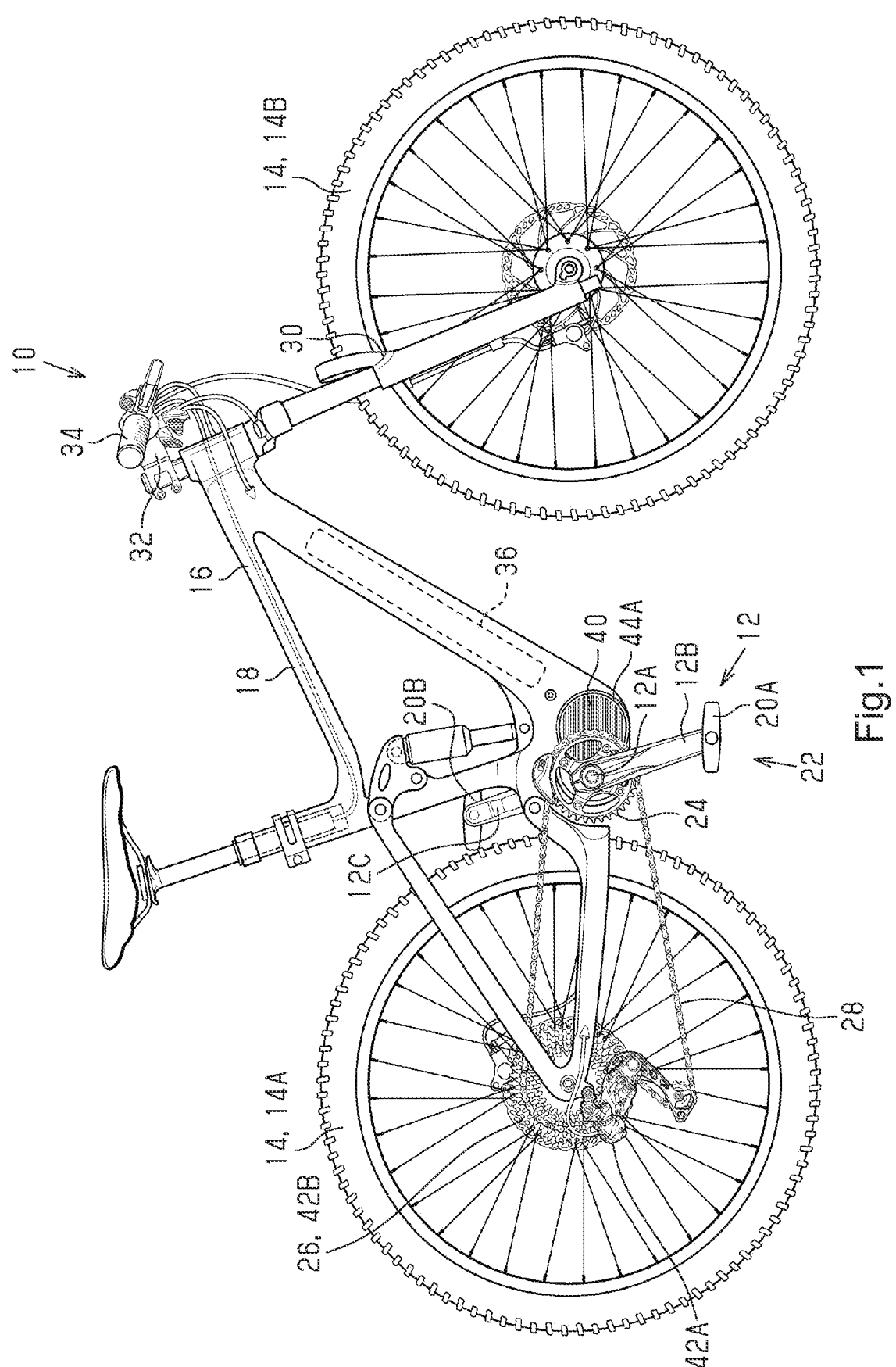
FIG. 1 is a side elevational view of a human-powered vehicle including an embodiment of a control device for a human-powered vehicle.
Figure 2:
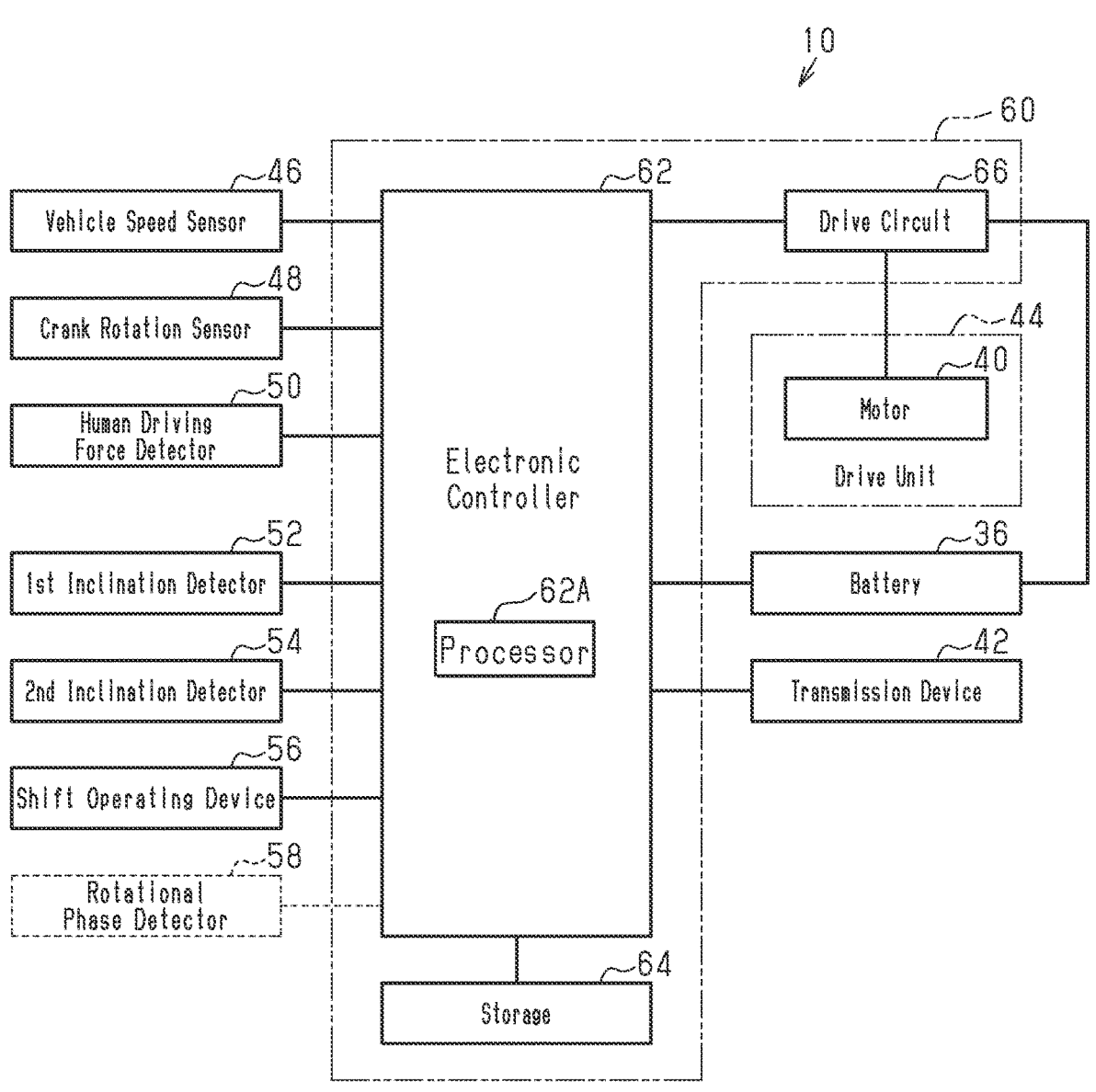
FIG. 2 is a block diagram showing the electrical configuration of the human-powered vehicle including the control device of the embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

A first embodiment of an electronic control device 60 (hereinafter referred to as the control device 60) for a human-powered vehicle will now be described with reference to FIGS. 1 to 4. A human-powered vehicle 10 is a vehicle including at least one wheel and driven by at least a human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including three or more wheels. The human-powered vehicle 10 is not limited to a vehicle configured to be driven only by the human driving force H. The human-powered vehicle 10 includes an E-bike that uses a driving force of an electric motor in addition to the human driving force H for propulsion. The E-bike includes an electric assist bicycle that assists in propulsion with an electric motor. In the embodiments described below, the human-powered vehicle 10 refers to an electric assist bicycle. An example of the electric assist bicycle is a mountain bike.

The human-powered vehicle 10 includes a crank 12 into which the human driving force H is input. The human-powered vehicle 10 further includes at least one wheel 14 and a vehicle body 16. The at least one wheel 14 includes a rear wheel 14A and a front wheel 14B. The vehicle body 16 includes a frame 18. The crank 12 includes an input rotational shaft 12A rotatable relative to the frame 18, a first crank arm 12B, and a second crank arm 12C. The first crank arm 12B is provided on a first axial end of the input rotational shaft 12A. The second crank arm 12C is provided on a second axial end of the input rotational shaft 12A. In the present embodiment, the input rotational shaft 12A is a crank axle. A pedal 20A is coupled to the first crank arm 12B. A pedal 20B is coupled to the second crank arm 12C. The rear wheel 14A is driven in accordance with rotation of the crank 12. The rear wheel 14A is supported by the frame 18. The crank 12 and the rear wheel 14A are coupled by a drive mechanism 22.

The drive mechanism 22 includes a first rotary body 24 coupled to the input rotational shaft 12A. The input rotational shaft 12A and the first rotary body 24 can be coupled so as to rotate integrally with each other or can be coupled by a first one-way clutch. The first one-way clutch is configured to rotate the first rotary body 24 forward in a case where the crank 12 rotates forward and allow the first rotary body 24 to rotate relative to the crank 12 in a case where the crank 12 rotates rearward. The first rotary body 24 includes a front sprocket. The first rotary body 24 can include a pulley or a bevel gear. The drive mechanism 22 further includes a second rotary body 26 and a linking member 28. The linking member 28 transmits rotational force of the first rotary body 24 to the second rotary body 26. The linking member 28 includes, for example, a chain, a belt, or a shaft.

The second rotary body 26 is coupled to the rear wheel 14A. The second rotary body 26 includes a rear sprocket. The second rotary body 26 can include a pulley or a bevel gear. Preferably, a second one-way clutch is provided between the second rotary body 26 and the rear wheel 14A. The second one-way clutch is configured to rotate the rear wheel 14A forward in a case where the second rotary body 26 rotates forward and allow the rear wheel 14A to rotate relative to the second rotary body 26 in a case where the second rotary body 26 rotates rearward.

The front wheel 14B is attached to the frame 18 by a front fork 30. A handlebar 34 is coupled to the front fork 30 by a stem 32. In the present embodiment, the rear wheel 14A is coupled to the crank 12 by the drive mechanism 22. However, any one of the rear wheel 14A and the front wheel 14B can be coupled to the crank 12 by the drive mechanism 22.

The human-powered vehicle 10 further includes a battery 36. The battery 36 includes one or more battery elements. The battery elements include a rechargeable battery. The battery 36 is configured to supply electric power to the control device 60. Preferably, the battery 36 is connected to an electronic controller 62 of the control device 60 by an electric cable or a wireless communication device to communicate with the electronic controller 62. The battery 36 is configured to communicate with the electronic controller 62 through, for example, power line communication (PLC), controller area network (CAN), or universal asynchronous receiver/transmitter (UART).

The human-powered vehicle 10 includes a motor 40 and a transmission device 42 for the human driving force H. The transmission device 42 is provided on the transmission path of the human driving force H and has a transmission ratio R. The transmission device 42 includes an input portion into which the human driving force H is input and an output portion from which the human driving force H is output. The transmission ratio R is expressed as a ratio of a rotational speed V2 of the output portion of the transmission device 42 to a rotational speed V1 of the input portion of the transmission device 42. The transmission ratio R is expressed by Equation 1. In a case where the rotational speed of the input portion is constant, the rotational speed of the output portion increases as the transmission ratio R increases. Thus, the rotational speed of the wheel 14 increases.

$$\text{Transmission Ratio } R = \text{Rotational Speed } V2/ \text{ Rotational Speed } V1 \quad \text{Equation 1:}$$

Preferably, the transmission device 42 includes a derailleur 42A, a rotational axis, and sprockets 42B aligned along the rotational axis. In a case where the derailleur 42A is a rear derailleur, the second rotary body 26 includes the sprockets 42B. In a case where the derailleur 42A is a front derailleur, the first rotary body 24 includes the sprockets 42B. In a case where the transmission device 42 includes the derailleur 42A, the output portion of the transmission device 42 corresponds to the second rotary body 26. In a case where the transmission device 42 includes the derailleur 42A, the input portion of the transmission device 42 corresponds to the first rotary body 24. Preferably, the transmission device 42 includes an electric actuator. The electric actuator is provided on the derailleur 42A and actuates the derailleur 42A. The transmission device 42 can include an internal shifting device. The internal shifting device is provided, for example, on a hub of the rear wheel 14A.

The motor 40 is configured to apply a propulsion force to the human-powered vehicle 10. The motor 40 includes one or more electric motors. The electric motor is, for example, a brushless motor. The motor 40 is configured to transmit a rotational force to the transmission device 42 in the transmission path of the human driving force H extending from the pedals 20A and 20B to the rear wheel 14A. In the present embodiment, the motor 40 is provided on the frame 18 of the human-powered vehicle 10, and is configured to transmit a rotational force to the first rotary body 24. Thus, the motor 40 constitutes an assist motor.

The motor 40 is provided on a housing 44A. The housing 44A is provided on the frame 18. The housing 44A is, for example, detachably attached to the frame 18. The motor 40 and the housing 44A on which the motor 40 is provided are included in a drive unit 44. In the present embodiment, preferably, a third one-way clutch is provided on the power transmission path between the motor 40 and the input rotational shaft 12A so that in a case where the input rotational shaft 12A is rotated in a direction in which the human-powered vehicle 10 travels forward, a rotational force of the crank 12 will not be transmitted to the motor 40.

The human-powered vehicle 10 includes the control device 60. Preferably, the control device 60 is provided on the housing 44A of the drive unit 44. The control device 60 can be provided on the frame 18. The control device 60 includes the electronic controller 62. The electronic controller 62 includes at least one processor 62A that executes a predetermined control program. The processor 62A of the electronic controller 62 includes, for example, a central processing unit (CPU) or a micro processing unit (MPU). The electronic controller 62 can include additional processors provided at positions separate from each other. The electronic controller 62 can include one or more microcomputers. Thus, the term "electronic controller" as used herein refers to hardware that executes a software program, and does not include a human. Preferably, the control device 60 further includes storage 64. The storage 64 stores a control program and information used for a control process. The storage 64 includes any computer storage device or any non-transitory computer-readable medium with the sole exception of a transitory, propagating signal. For example, the storage 64 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Preferably, the control device 60 further includes a drive circuit 66 of the motor 40. Preferably, the drive circuit 66 and the electronic controller 62 are provided on the housing 44A of the drive unit 44. The drive circuit 66 and the electronic controller 62 can be provided, for example, on the same circuit substrate. The drive circuit 66 includes an inverter circuit. The drive circuit 66 controls electric power supplied from the battery 36 to the motor 40. The drive circuit 66 is connected to the electronic controller 62 by a conductive wire, an electric cable, or a wireless communication device. The drive circuit 66 drives the motor 40 in accordance with a control signal from the electronic controller 62.

Preferably, the human-powered vehicle 10 further includes at least one of a vehicle speed sensor 46, a crank rotation sensor 48, and a human driving force detector 50. The terms "sensor" and as "detector" used herein refers to a hardware device or instrument designed to detect the presence or absence of a particular event, object, substance, or a change in its environment, and to emit a signal in response. The terms "sensor" and as "detector" as used herein does not include a human. The vehicle speed sensor 46 is configured to detect information related to a vehicle speed V of the human-powered vehicle 10. The vehicle speed sensor 46 is connected to the electronic controller 62 by a wireless communication device or an electric cable. In the present embodiment, the vehicle speed sensor 46 is configured to detect information related to a rotational speed W of at least one wheel 14 of the human-powered vehicle 10. The vehicle speed sensor 46 outputs a signal corresponding to the rotational speed W of the wheel 14. The electronic controller 62 calculates the vehicle speed V of the human-powered vehicle 10 based on a signal corresponding to the rotational speed W of the wheel 14 and information related to the perimeter of the wheel 14. The information related to the perimeter of the wheel 14 is stored in the storage 64.

The vehicle speed sensor 46 includes, for example, a magnetic reed forming a reed switch or a magnetic sensor such as a Hall element. The vehicle speed sensor 46 can be attached to a chainstay of the frame 18 of the human-powered vehicle 10 and configured to detect a magnet attached to the rear wheel 14A or can be provided on the front fork 30 and configured to detect a magnet attached to the front wheel 14B. In the present embodiment, the vehicle speed sensor 46 is configured so that the reed switch detects the magnet once in one rotation of the wheel 14. The vehicle speed sensor 46 can have any configuration that obtains information related to the vehicle speed V of the human-powered vehicle 10. The vehicle speed sensor 46 is not limited to a configuration that detects a magnet provided on the wheel 14 and can, for example, be configured to detect a slit provided on a disc brake, include an optical sensor, or include a global positioning system (GPS) receiver. In a case where the vehicle speed sensor 46 includes a GPS receiver, the electronic controller 62 can calculate the vehicle speed V based on time and a travelled distance.

The crank rotation sensor 48 is configured to detect information related to rotational speed C of the input rotational shaft 12A. The crank rotation sensor 48 is connected to the electronic controller 62 by a wireless communication device or an electric cable. The crank rotation sensor 48 is provided, for example, on the frame 18 of the human-powered vehicle 10 or the drive unit 44. The crank rotation sensor 48 can be provided on the housing 44A of the drive unit 44. The crank rotation sensor 48 is configured to include a magnetic sensor that outputs a signal corresponding to the strength of the magnetic field. An annular magnet having a magnetic field, the strength of which changes in the circumferential direction, is provided on the input rotational shaft 12A, a member that rotates in cooperation with the input rotational shaft 12A, or a power transmission path extending between the input rotational shaft 12A and the first rotary body 24. The member that rotates in cooperation with the input rotational shaft 12A can include an output shaft of the motor 40.

The crank rotation sensor 48 outputs a signal corresponding to the rotational speed C of the input rotational shaft 12A. For example, in a case where the first one-way clutch is not provided between the input rotational shaft 12A and the first rotary body 24, the magnet can be provided on the first rotary body 24. The crank rotation sensor 48 can have any configuration that obtains information related to the rotational speed C of the input rotational shaft 12A and can include an optical sensor, an acceleration sensor, a gyro sensor, or a torque sensor instead of a magnetic sensor.

The human driving force detector 50 is configured to detect information related to the human driving force H. The human driving force detector 50 is connected to the electronic controller 62 via a wireless communication device or an electric cable. The human driving force detector 50 is provided, for example, on the frame 18 of the human-powered vehicle 10, the drive unit 44, the crank 12, or the pedals 20A and 20B. The human driving force detector 50 can be provided on the housing 44A of the drive unit 44. The human driving force detector 50 includes, for example, a torque sensor. The torque sensor is configured to output a signal corresponding to torque applied to the crank 12 by the human driving force H. For example, in a case where the first one-way clutch is provided on the power transmission path, it is preferred that the torque sensor is provided at the upstream side of the first one-way clutch in the power transmission path. The torque sensor includes, for example, a strain sensor, a magnetostrictive sensor, or a pressure sensor. The strain sensor includes a strain gauge.

The torque sensor is provided in the power transmission path or the vicinity of a member included in the power transmission path. The member included in the power transmission path includes, for example, the input rotational shaft 12A, a member that transmits the human driving force H between the input rotational shaft 12A and the first rotary body 24, the crank arms 12B and 12C, and the pedals 20A and 20B. The human driving force detector 50 can have any configuration that obtains information related to the human driving force H and can include, for example, a sensor that detects pressure applied to the pedals 20A and 20B or a sensor that detects tension of a chain.

Preferably, the electronic controller 62 is configured to control the transmission device 42. The control device 60 and the electric actuator of the transmission device 42 are connected by a conductive wire, an electric cable, or a wireless communication device. The electric actuator of the transmission device 42 is supplied with electric power from the battery 36. In a case where the electronic controller 62 changes the transmission ratio R of the transmission device 42, the electronic controller 62 starts a shifting action with the transmission device 42 in a case where the human driving force H decreases.

The electronic controller 62 can be configured to determine that human driving force H is decreased, for example, based on an output of the human driving force detector 50. In a case where the electronic controller 62 determines that the human driving force H is decreased based on an output of the human driving force detector 50, the electronic controller 62, for example, obtains a detection value of the human driving force H in a predetermined cycle and compares the detection value detected in the previous cycle with the detection value detected in the present cycle. In a case where the detection value detected in the present cycle is less than the detection value detected in the previous cycle, the predetermined the electronic controller 62 determines that the human driving force H is decreased. In a case where the detection value detected in the present cycle is continuously less than the detection value detected in the previous cycle a number of times, the electronic controller 62 can determine that the human driving force H is decreased. Preferably, the predetermined cycle is, for example, less than a period in which the crank 12 performs five rotations.

The electronic controller 62 can be configured to determine that the human driving force H is decreased, for example, based on an output of the crank rotation sensor 48. In a case where the electronic controller 62 determines that the human driving force H is decreased based on an output of the crank rotation sensor 48, the electronic controller 62 determines that the human driving force H is decreased, for example, in a case where the rotational angle of the input rotational shaft 12A is in a range including an angle corresponding to the angle at which the human driving force H is decreased most. In a case where the electronic controller 62 determines that the human driving force H is decreased based on an output of the crank rotation sensor 48, the electronic controller 62 determines that the human driving force H is decreased, for example, in a case where the rotational angle of the input rotational shaft 12A is in a predetermined range including top dead center or bottom dead center of the crank arms 12B and 12C.

Preferably, the human-powered vehicle 10 further includes a shift operating device 56. The shift operating device 56 is configured to be manually operable by the user. The shift operating device 56 is provided, for example, on the handlebar 34. The shift operating device 56 is connected to the electronic controller 62 via a wireless communication device or an electric cable. The shift operating device 56 includes a first operating portion configured to increase the transmission ratio R of the transmission device 42 and a second operating portion configured to decrease the transmission ratio R of the transmission device 42. In a case where the first operating portion is operated, a shifting request that causes the electronic controller 62 to increase the transmission ratio R is generated, and the shifting request is transmitted from the first operating portion to the electronic controller 62. In a case where the second operating portion is operated, a shifting request that causes the electronic controller 62 to decrease the transmission ratio R is generated, and the shifting request is transmitted from the second operating portion to the electronic controller 62. Each of the first operating portion and the second operating portion includes an operating member and a detector configured to detect operation of the operating member. The detector includes an electrical switch or a sensor. The type of a sensor included in the detector is not limited and can be a magnetic sensor or an optical sensor.

Figure 3:
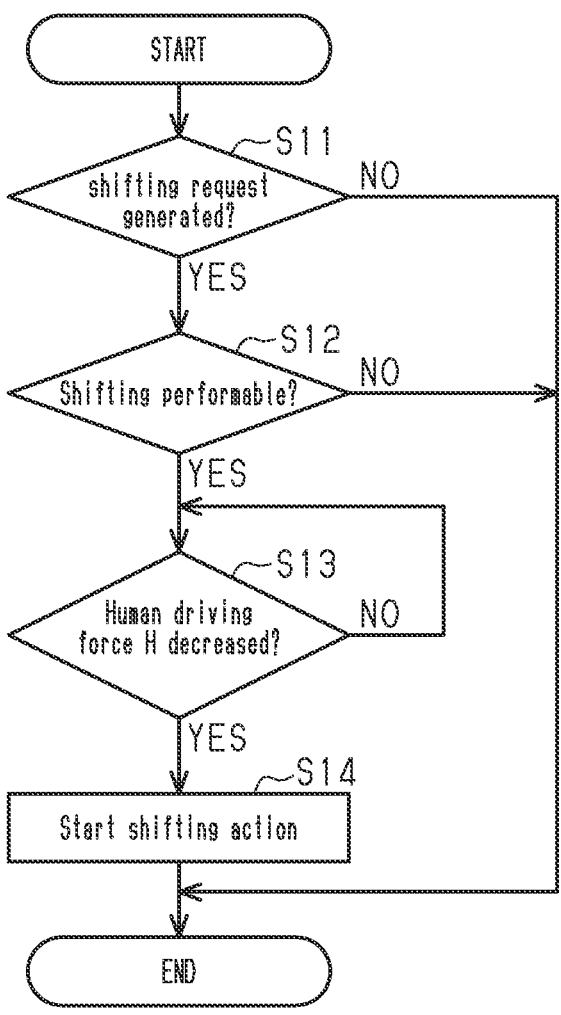
FIG. 3 is a flowchart of a process executed by the electronic controller shown in FIG. 2 for controlling a transmission device.

A process for changing the control state of the transmission device 42 with the electronic controller 62 will now be described with reference to FIG. 3. For example, in a case where electric power is supplied to the electronic controller 62, the electronic controller 62 starts the process and proceeds to step S11 of the flowchart shown in FIG. 3. In a case where the flowchart shown in FIG. 3 ends, the electronic controller 62 repeats the process from step S11 after a predetermined interval, for example, until the supply of electric power stops.

In step S11, the electronic controller 62 determines whether a shifting request is generated. The shifting request is generated by operation of the shift operating device. The shifting request can be generated by the electronic controller 62 in accordance with at least one of a traveling state and a traveling environment of the human-powered vehicle 10. The traveling state of the human-powered vehicle 10 includes at least one of the vehicle speed V, the rotational speed C of the input rotational shaft 12A, the human driving force H, and a pitch angle of the human-powered vehicle 10. The traveling environment of the human-powered vehicle 10 includes a gradient of the road on which the human-powered vehicle 10 is traveling. The electronic controller 62 compares a predetermined threshold value with a parameter related to at least one of the traveling state and the traveling environment of the human-powered vehicle 10. The electronic controller 62 generates the shifting request in at least one of a case where the parameter is greater than the predetermined threshold value and a case where the parameter is less than the predetermined threshold value. In a case where the shifting request is not generated, the electronic controller 62 ends the process. In a case where the shifting request is generated, the electronic controller 62 proceeds to step S12.

In step S12, the electronic controller 62 determines whether shifting is performable. For example, in a case where a shifting request for increasing the transmission ratio R is generated and the present transmission ratio R is less than the maximum transmission ratio R of the transmission device 42, the electronic controller 62 determines that shifting is performable. For example, in a case where the shifting request for increasing the transmission ratio R is generated and the present transmission ratio R is equal to the maximum transmission ratio R of the transmission device 42, the electronic controller 62 determines that shifting is not performable. For example, in a case where the shifting request for increasing the transmission ratio R is generated and the present transmission ratio R is less than the maximum transmission ratio R of the transmission device 42, the electronic controller 62 determines that shifting is performable. For example, in a case where a shifting request for decreasing the transmission ratio R is generated and the present transmission ratio R is equal to the minimum transmission ratio R of the transmission device 42, the electronic controller 62 determines that shifting is not performable. In a case where shifting is not performable, the electronic controller 62 ends the process. In a case where shifting is performable, the electronic controller 62 proceeds to step S13.

In step S13, the electronic controller 62 determines whether the human driving force H is decreased. In a case where the human driving force H is not decreased, the electronic controller 62 again executes the determination process of step S13. In a case where the human driving force H is decreased, the electronic controller 62 proceeds to step S14.

In step S14, the electronic controller 62 starts a shifting action with the transmission device 42 and then ends the process. The electronic controller 62 drives the electric actuator of the transmission device 42 to start a shifting action with the transmission device 42.

The electronic controller 62 is configured to control the motor 40 that applies propulsion force to the human-powered vehicle 10. Preferably, the electronic controller 62 controls the motor 40 in accordance with at least one of the vehicle speed V, the rotational speed C of the input rotational shaft 12A, and the human driving force H. Preferably, the electronic controller 62 is configured to control the motor 40 in accordance with the human driving force H that is input to the human-powered vehicle 10. The human driving force H can be expressed as torque or power.

The electronic controller 62 is configured to control the motor 40, for example, so that the assist level of the motor 40 equals a predetermined assist level A. For example, the assist level A includes a ratio of the assist force of the motor 40 to the human driving force H. For example, the assist level A includes a restriction level L that restricts changes in output of the motor 40 in a case where the output of the motor 40 decreases. For example, the assist level A can include one or both of the ratio of an assist force of the motor 40 to the human driving force H and the restriction level L that restricts changes in output of the motor 40 in a case where the output of the motor 40 decreases. The assist level A can include an upper limit value MX of output of the motor 40 in addition to at least one of the ratio of the assist force of the motor 40 to the human driving force H and the restriction level L that restricts changes in output of the motor 40 in a case where the output of the motor 40 decreases.

In this description, the ratio of the assist force produced by the motor 40 to the human driving force H is also referred to as the assist ratio. The electronic controller 62 is configured to control the motor 40, for example, so that the ratio of the assist force produced by the motor 40 to the human driving force H equals a predetermined ratio. The human driving force H corresponds to propulsion force of the human-powered vehicle 10 that is generated by the user rotating the crank 12. The assist force corresponds to a propulsion force of the human-powered vehicle 10 that is generated in accordance with rotation of the motor 40. The predetermined ratio is not fixed and can be changed, for example, in accordance with the human driving force H, the rotational speed C of the input rotational shaft 12A, or the vehicle speed V, or any two or all of the human driving force H, the rotational speed C of the input rotational shaft 12A, and the vehicle speed V.

In a case where the human driving force H and the assist force are expressed as torque, the human driving force H is referred to as a human torque HT, and the assist force is referred to as an assist torque MT. In a case the human driving force H and the assist force are expressed as power, the human driving force H is referred to as a human power HW, and the assist force is referred to as an assist power MW. The ratio of the assist force of the motor 40 to the human driving force H can be a torque ratio of the assist torque MT to the human torque HT of the human-powered vehicle 10 or can be a ratio of the assist power MW of the motor 40 to the human power HW.

In the drive unit 44 of the present embodiment, the crank 12 is connected to the first rotary body 24 without using the shifting device, and an output of the motor 40 is input to the first rotary body 24. In the present embodiment, the human driving force H corresponds to a driving force that is input to the first rotary body 24 by the user rotating the crank 12. In the present embodiment, the assist force corresponds to a driving force that is input to the first rotary body 24 by rotation of the motor 40. In a case where the output of the motor 40 is input to the first rotary body 24 through a speed reducer, the assist force corresponds to an output of the speed reducer.

The electronic controller 62 is configured to control the motor 40 so that the assist force becomes less than or equal to the upper limit value MX. In a case where the output of the motor 40 is input to the first rotary body 24 and the assist force is expressed as torque, the electronic controller 62 is configured to control the motor 40 so that the assist torque MT becomes less than or equal to an upper limit value MTX. Preferably, the upper limit value MTX is in a range of 20 Nm or greater and 200 Nm or less. In a case where the output of the motor 40 is input to the first rotary body 24 and the assist force is expressed as power, the electronic controller 62 is configured to control the motor 40 so that the assist power MW becomes less than or equal to an upper limit value MWX.

Preferably, the electronic controller 62 is configured to change the restriction level L that restricts changes in output of the motor 40. As the restriction level L, which restricts changes in output of the motor 40, increases, a changing amount of output of the motor 40 per unit time decreases relative to a changing amount of a control parameter of the motor 40 per unit time. As the restriction level L, which restricts changes in output of the motor 40, decreases, the changing amount of output of the motor 40 per unit time increases relative to the changing amount of the control parameter of the motor 40 per unit time. In the present embodiment, a control parameter of the motor 40 corresponds to the human driving force H. The control parameter of the motor 40 can correspond to the rotational speed C of the input rotational shaft 12A. Preferably, the restriction level L, which restricts changes in output of the motor 40, corresponds to the restriction level L in a case where the human driving force H or the rotational speed C of the input rotational shaft 12A decreases. The restriction level L, which restricts changes in output of the motor 40, is inversely proportional to a response speed of the motor 40. The response speed of the motor 40 is expressed as the changing amount of output of the motor 40 per unit time relative to the changing amount of the control parameter of the motor 40 per unit time. Increases in the restriction level L, which restricts changes in output of the motor 40, decrease the response speed of the motor 40.

The electronic controller 62 changes the restriction level L using, for example, a filter circuit. The filter circuit includes, for example, a low-pass filter having a time constant. The electronic controller 62 changes the restriction level L by changing the time constant of the filter. The electronic controller 62 can change the restriction level L by changing a gain for calculating the output of the motor 40 from the human driving force H. The filter circuit is, for example, implemented by executing predetermined software with a processor.

The electronic controller 62 is configured to assist propulsion of the human-powered vehicle 10 with the motor 40 in a state where the human-powered vehicle 10 is propelled by the human driving force H. In a case where the transmission ratio R of the transmission device 42 is changed, the electronic controller 62 decreases the assist level A of the motor 40 in accordance with the human driving force H input to the human-powered vehicle 10 and controls the motor 40 so that the assist level A is greater for a case where the human driving force is a first human driving force H1 than the assist level for a case where the human driving force is a second human driving force H2 that is less than the first human driving force H1. The first human driving force H1 and the second human driving force H2 can be expressed as torque or power.

For example, in a case where the transmission ratio R of the transmission device 42 is changed and the human driving force H is the first human driving force H1, the electronic controller 62 sets the assist level A to a first assist level A1. A state where the human driving force H is the first human driving force H1 corresponds to a case where the human driving force H is greater than or equal to a predetermined first driving force HY. For example, in a case where the transmission ratio R of the transmission device 42 is changed and the human driving force H is the second human driving force H2, the electronic controller 62 sets the assist level A to a second assist level A2. A state where the human driving force H is the second human driving force H2 corresponds to a case where the human driving force H is less than the predetermined first driving force HY. The first assist level A1 is greater than the second assist level A2.

Preferably, in a case where the transmission ratio R of the transmission device 42 is changed and the human driving force H is less than a predetermined human driving force HX, the electronic controller 62 maintains the assist level A. The predetermined human driving force HX is less than the predetermined first driving force HY.

For example, in a case where the assist level A is expressed as the ratio of the assist force of the motor 40 to the human driving force H and the human driving force H is expressed as torque, the electronic controller 62 decreases the assist level A as shown in Table 1. A decrease rate of the assist level A is a ratio of the decreased assist level A to the assist level A corresponding to a state before the decrease. In Table 1, X1 and X2 are numeral values where X1<X2. For example, X1 is 30, and X2 is 60.

TABLE 1

| | Human Driving Force H | Decrease Rate in Assist Level A |
|---|---|---|
| 1st Human Driving Force H1 | 30 Nm or greater | X1% |
| 2nd Human Driving | 5 Nm or greater and less | X2% |

TABLE 1-continued

|  | Human Driving Force H | Decrease Rate in Assist Level A |
|---|---|---|
| Force H2 <Predetermined Human Driving Force HX | than 30 Nm Less than 5 Nm | 0% |

Preferably, in a case where the transmission ratio R of the transmission device 42 is changed, the electronic controller 62 starts a process for decreasing the assist level A in a case where the angle of the crank 12 is in a predetermined range. The predetermined range includes, for example, an angle of the crank 12 that is separated by 90 degrees from a position corresponding to top dead center or bottom dead center of the crank arms 12B and 12C. The predetermined range includes, for example, a range of angles of the crank 12 including a center angle that is separated by 90 degrees from the position corresponding to the top dead center or bottom dead center of the crank arms 12B and 12C and separated from 10 to 45 degrees from the center angle. The predetermined range is set to a range, for example, such that the rider is less likely to feel a decrease in the assist level A.

Preferably, in a case where the electronic controller 62 decreases the assist level A of the motor 40, the electronic controller 62 starts a process for decreasing the assist level A of the motor 40 in accordance with a state of the shifting action of the transmission device 42. For example, in a case where the shifting action of the transmission device 42 has started, the electronic controller 62 decreases the assist level A. In a case where the transmission device 42 includes an electric actuator, the electronic controller 62 can start to decrease the assist level A after a shifting request is generated and before the shifting action of the transmission device 42 starts.

Preferably, in a case where the electronic controller 62 decreases the assist level A, the electronic controller 62 gradually decreases the assist level A. For example, in a case where the assist level A is decreased to the first assist level A1, the electronic controller 62 can be configured to decrease the assist level A to the first assist level A1 in a stepped manner whenever a predetermined time elapses. For example, in a case where the assist level A is decreased to the first assist level A1, the electronic controller 62 can be configured to continuously decrease the assist level A to the first assist level A1. For example, in a case where the assist level A is decreased to the second assist level A2, the electronic controller 62 can be configured to decrease the assist level A to the second assist level A2 in a stepped manner whenever a predetermined time elapses. For example, in a case where the assist level A is decreased to the second assist level A2, the electronic controller 62 can be configured to continuously decrease the assist level A to the second assist level A2 in a stepped manner whenever a predetermined time elapses.

Preferably, the electronic controller 62 increases the assist level A in a case where a predetermined period TX has elapsed since the assist level A is decreased. Preferably, the predetermined period TX includes a period during which a rotation amount of the wheel 14 of the human-powered vehicle 10 becomes a predetermined rotation amount. The predetermined rotation amount is greater than or equal to 30 degrees and less than 460 degrees. Preferably, the predetermined rotation amount is set in accordance with a period from a start to completion of the shifting action of the transmission device 42. Preferably, in a case where the predetermined period TX has elapsed since the assist level A is decreased, the electronic controller 62 changes the assist level A to return to the assist level A corresponding to a state before the decrease. The assist level A corresponding to a state before the decrease is, for example, the assist level A in a state immediately before the assist level A is decreased.

Preferably, the electronic controller 62 increases the assist level A if changing of the transmission ratio R is completed. Preferably, the transmission device 42 includes a shifting state detector that detects information related to the present shift stage. The shifting state detector includes, for example, a sensor that outputs a signal in accordance with an actuation of the electric actuator. The electronic controller 62 can determine whether changing of the transmission ratio R is completed in accordance with the rotational speed C of the input rotational shaft 12A and the rotational speed W of the wheel 14. In a case where the human driving force H is greater than or equal to a predetermined threshold value, the electronic controller 62 calculates the transmission ratio R from the rotational speed C of the input rotational shaft 12A and the rotational speed W of the wheel 14. Preferably, if changing of the transmission ratio R is completed, the electronic controller 62 changes the assist level A so that the assist level A returns to the assist level A corresponding to a state before the decrease.

A process for changing the control state in which the electronic controller 62 controls the motor 40 will now be described with reference to FIG. 4. For example, in a case where electric power is supplied to the electronic controller 62, the electronic controller 62 starts the process and proceeds to step S21 of the flowchart shown in FIG. 4. In a case where the flowchart shown in FIG. 4 ends, the electronic controller 62 repeats the process from step S21 after a predetermined interval, for example, until the supply of electric power stops.

In step S21, the electronic controller 62 determines whether the transmission ratio R of the transmission device 42 is changed. In a case where the transmission ratio R of the transmission device 42 is not changed, the electronic controller 62 ends the process. In a case where the transmission ratio R of the transmission device 42 is changed, the electronic controller 62 proceeds to step S23. In the present embodiment, in a case where the shifting request is generated, the electronic controller 62 determines that the transmission ratio R of the transmission device 42 is changed.

In step S23, the electronic controller 62 determines whether the human driving force H is greater than or equal to the predetermined human driving force HX. In a case where the human driving force H is greater than or equal to the predetermined human driving force HX, the electronic controller 62 proceeds to step S24. In step S23, in a case where the human driving force H is not greater than or equal to the predetermined human driving force HX, the electronic controller 62 ends the process.

In step S24, the electronic controller 62 determines whether the human driving force H is greater than or equal to the predetermined first driving force HY. In a case where the human driving force H is greater than or equal to the predetermined first driving force HY, the electronic controller 62 proceeds to step S25. In step S25, the electronic controller 62 changes the assist level A to the first assist level A1 and then proceeds to step S27.

In step S24, in a case where the human driving force H is not greater than or equal to the predetermined first driving force HY, the electronic controller 62 proceeds to step S26.

In step S26, the electronic controller 62 changes the assist level A to the second assist level A2 and then proceeds to step S27.

In step S27, the electronic controller 62 determines whether the predetermined period TX has elapsed. In a case where the predetermined period TX has elapsed, the electronic controller 62 proceeds to step S29. In a case where the predetermined period TX has not elapsed, the electronic controller 62 proceeds to step S28. In step S28, the electronic controller 62 determines whether changing of the transmission ratio R is completed. In a case where changing of the transmission ratio R is not completed, the electronic controller 62 proceeds to step S27. In a case where changing of the transmission ratio R is completed, the electronic controller 62 proceeds to step S29. In step S29, the electronic controller 62 increases the assist level A and then ends the process.

The electronic controller 62 can be configured to decrease the assist level A in accordance with at least one of the traveling state of the human-powered vehicle 10 and the traveling environment of the human-powered vehicle 10 in addition to human driving force H.

In a case where the electronic controller 62 decreases the assist level A, the electronic controller 62 can decrease the assist level A in accordance with the transmission ratio R. Preferably, the electronic controller 62 decreases the assist level A so that the assist level A is greater for a case where the human driving force H is a third human driving force H3 and the transmission ratio R is less than a first transmission ratio R1 than the assist level A for a case where the human driving force H is the third human driving force H3 and the transmission ratio R is greater than or equal to the first transmission ratio R1. The third human driving force H3 can be the same as or different from the predetermined first driving force HY. Preferably, the third human driving force H3 is greater than the predetermined human driving force HX.

For example, in a case where the third human driving force H3 is the first human driving force H1 and the electronic controller 62 decreases the assist level A to the first assist level A1, the first assist level A1 varies in accordance with the transmission ratio R. For example, the first assist level A1 includes a first assist level A11 for a case where the transmission ratio R is less than the first transmission ratio R1 and a first assist level A12 for a case where the transmission ratio R is greater than or equal to the first transmission ratio R1. The first assist level A11 is greater than the first assist level A12.

For example, in a case where the electronic controller 62 decreases the assist level A to the first assist level A1 and the transmission ratio R is less than the first transmission ratio R1, the electronic controller 62 decreases the assist level A to the first assist level A11. For example, in a case where the electronic controller 62 decreases the assist level A to the first assist level A1 and the transmission ratio R is greater than or equal to the first transmission ratio R1, the electronic controller 62 decreases the assist level A to the first assist level A12.

For example, in a case where the third human driving force H3 is the second human driving force H2 and the electronic controller 62 decreases the assist level A to the second assist level A2, the second assist level A2 varies in accordance with the transmission ratio R. For example, the second assist level A2 includes a second assist level A21 for a case where the transmission ratio R is less than the first transmission ratio R1 and a second assist level A22 for a case where the transmission ratio R is greater than or equal to the first transmission ratio R1. The second assist level A21 is greater than the second assist level A22.

For example, in a case where the electronic controller 62 decreases the assist level A to the second assist level A2 and the transmission ratio R is less than the first transmission ratio R1, the electronic controller 62 decreases the assist level A to the second assist level A21. In a case where the electronic controller 62 decreases the assist level A to the second assist level A2 and the transmission ratio R is greater than or equal to the first transmission ratio R1, the electronic controller 62 decreases the assist level A to the second assist level A22.

A first modification of a process for changing the control state in which the electronic controller 62 controls the motor 40 will now be described with reference to FIGS. 4 and 5. For example, in a case where electric power is supplied to the electronic controller 62, the electronic controller 62 starts the process and proceeds to step S21 of the flowchart shown in FIG. 4. In a case where the flowchart shown in FIG. 4 ends, the electronic controller 62 repeats the process from step S21 after a predetermined interval, for example, until the supply of electric power stops.

Figure 4:
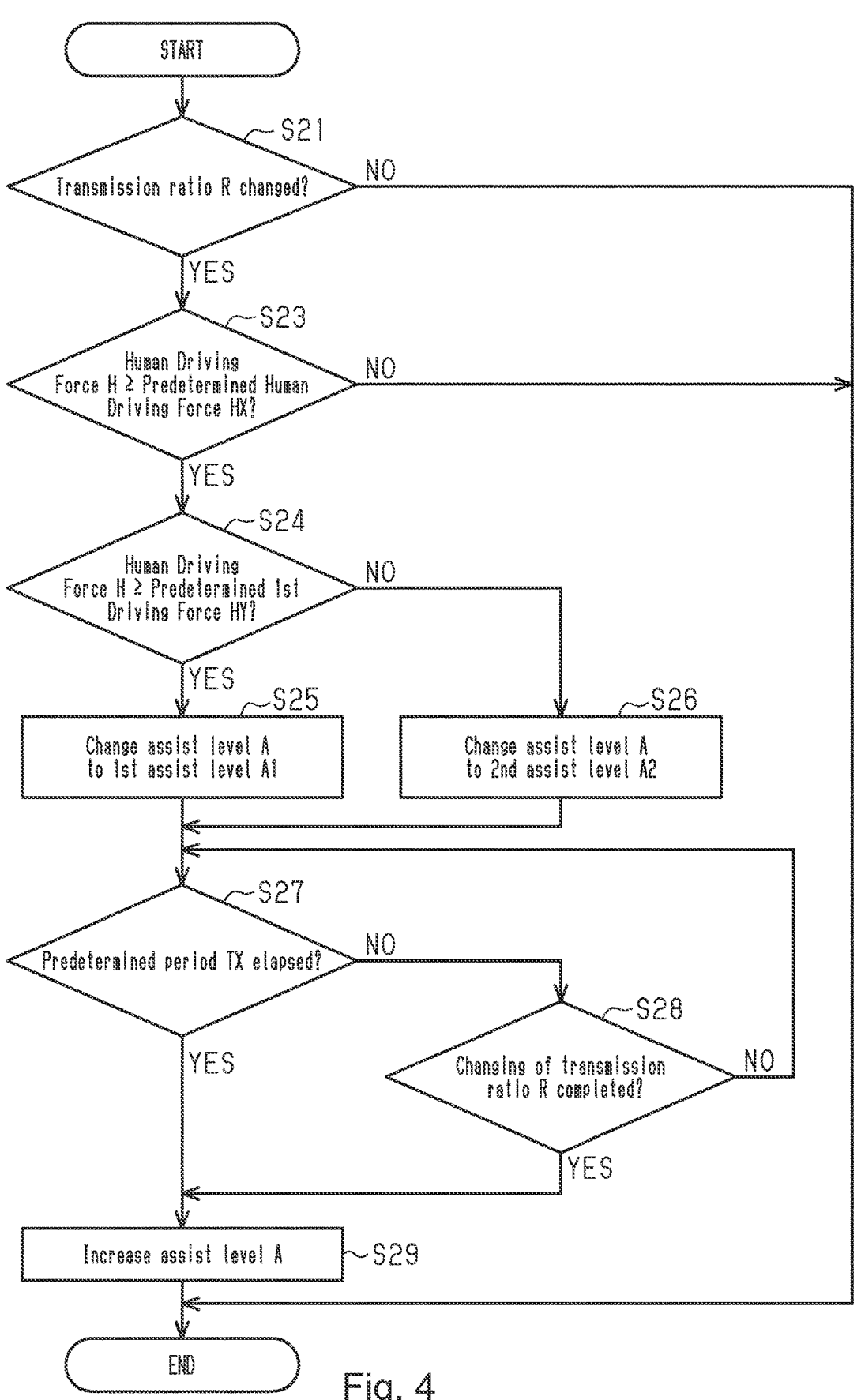
FIG. 4 is a flowchart of a process executed by the electronic controller shown in FIG. 2 for controlling a motor.
Figure 5:
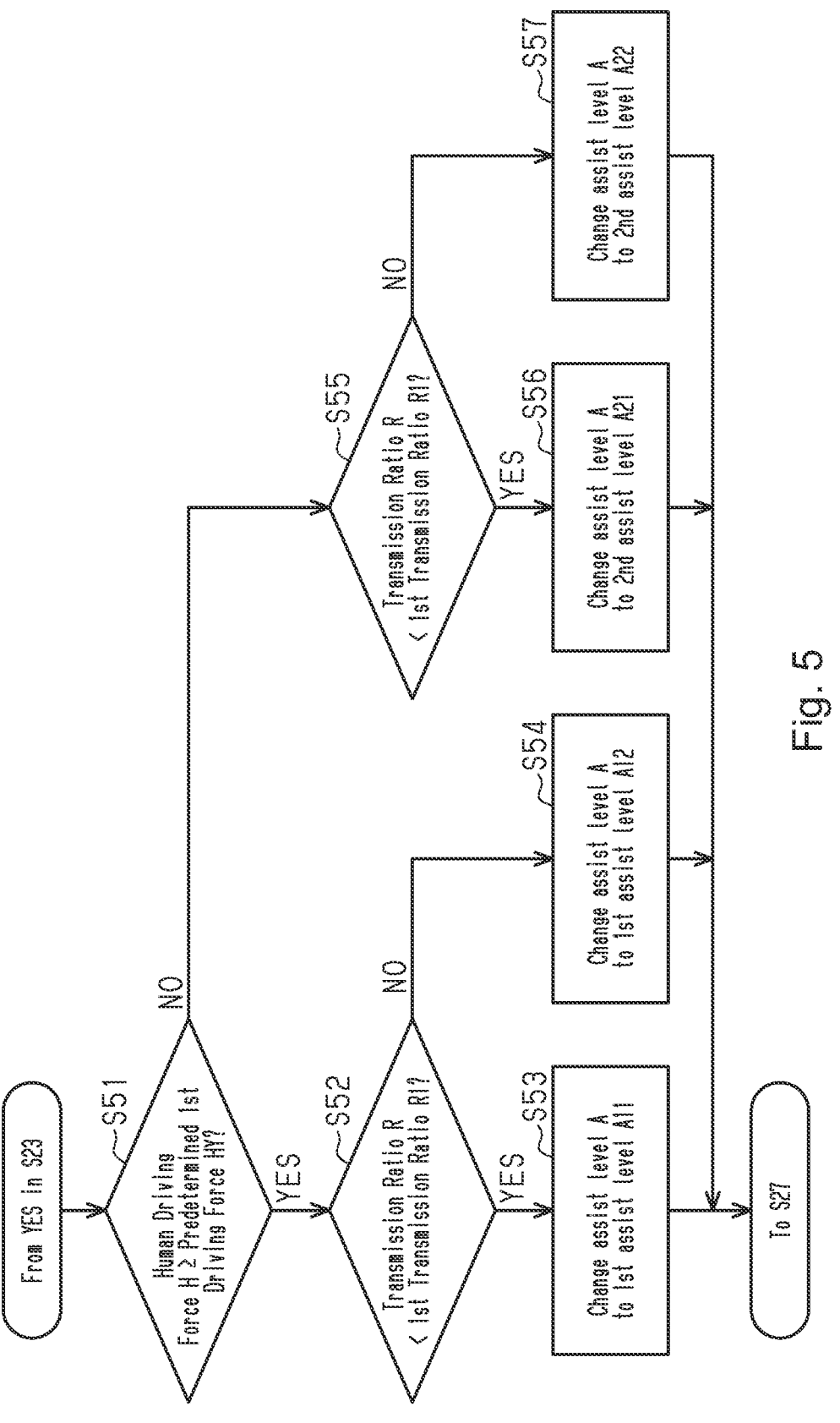
FIG. 5 is part of a flowchart of a process executed by the electronic controller shown in FIG. 2 for controlling the motor in a first modification.

In the first modification, the electronic controller 62 executes the same processes as shown in FIG. 4 except that the electronic controller 62 executes the process shown in FIG. 5 instead of steps S24, S25, and S26 shown in FIG. 4. The steps same as those in FIG. 4 will not be described.

In a case where the determination in step S23 is YES, the electronic controller 62 proceeds to step S51 shown in FIG. 5. In step S51, the electronic controller 62 determines whether the human driving force H is greater than or equal to the predetermined first driving force HY. In a case where the human driving force H is greater than or equal to the predetermined first driving force HY, the electronic controller 62 proceeds to step S52.

In step S52, the electronic controller 62 determines whether the transmission ratio R is less than the first transmission ratio R1. In a case where the transmission ratio R is less than the first transmission ratio R1, the electronic controller 62 proceeds to step S53. In step S53, the electronic controller 62 changes the assist level A to the first assist level A11 and then proceeds to step S27.

In step S52, in a case where the transmission ratio R is not less than the first transmission ratio R1, the electronic controller 62 proceeds to step S54. In step S54, the electronic controller 62 changes the assist level A to the first assist level A12 and then proceeds to step S27.

In step S51, in a case where the human driving force H is not greater than or equal to the predetermined first driving force HY, the electronic controller 62 proceeds to step S55. In step S55, the electronic controller 62 determines whether the transmission ratio R is less than the first transmission ratio R1. In a case where the transmission ratio R is less than the first transmission ratio R1, the electronic controller 62 proceeds to step S56. In step S56, the electronic controller 62 changes the assist level A to the second assist level A21 and then proceeds to step S27.

In step S55, in a case where the transmission ratio R is not less than the first transmission ratio R1, the electronic controller 62 proceeds to step S57. In step S57, the electronic controller 62 changes the assist level A to the second assist level A22 and then proceeds to step S27.

In a case where the electronic controller 62 decreases the assist level A, the electronic controller 62 can be configured to decrease the assist level A in accordance with a gradient S of the road on which the human-powered vehicle 10 is traveling. In this case, preferably, the human-powered vehicle 10 includes a first inclination detector 52 that detects the gradient S.

The first inclination detector 52 is configured to detect the gradient S of the road on which the human-powered vehicle 10 is traveling. The gradient S corresponds to a gradient in a traveling direction of the human-powered vehicle 10. The gradient S corresponds to a pitch angle of the human-powered vehicle 10. The first inclination detector 52 includes a GPS receiver. The electronic controller 62 can calculate the gradient S based on GPS information obtained by the GPS receiver and information related to road surface gradients included in map information stored in advance in the storage 64. The first inclination detector 52 is connected to the electronic controller 62 by a wireless communication device or an electric cable.

Preferably, the electronic controller 62 decreases the assist level A so that the assist level A is greater for a case where the human driving force H is a fourth human driving force H4 and the gradient S is greater than or equal to a first gradient S1 than the assist level A for a case where the human driving force H is the fourth human driving force H4 and the gradient S is less than the first gradient S1. The fourth human driving force H4 can be the same as or different from the predetermined first driving force HY. Preferably, the predetermined human driving force HX is less than the fourth human driving force H4.

For example, in a case where the fourth human driving force H4 is the first human driving force H1 and the electronic controller 62 decreases the assist level A to the first assist level A1, the electronic controller 62 decreases the assist level A in accordance with the gradient S. For example, the first assist level A1 includes a first assist level A13 for a case where the gradient S is greater than or equal to the first gradient S1 and a first assist level A14 for a case where the gradient S is less than the first gradient S1. The first assist level A13 is greater than the first assist level A14.

For example, in a case where the electronic controller 62 decreases the assist level A to the first assist level A1 and the gradient S is greater than or equal to the first gradient S1, the electronic controller 62 decreases the assist level A to the first assist level A13. In a case where the electronic controller 62 decreases the assist level A to the first assist level A1 and the gradient S is less than the first gradient S1, the electronic controller 62 decreases the assist level A to the first assist level A14.

For example, in a case where the fourth human driving force H4 is the second human driving force H2 and the electronic controller 62 decreases the assist level A to the second assist level A2, the electronic controller 62 decreases the assist level A to the second assist level A2 in accordance with the gradient S. For example, the second assist level A2 includes a second assist level A23 for a case where the gradient S is greater than or equal to the first gradient S1 and a second assist level A24 for a case where the gradient S is less than the first gradient S1. The second assist level A23 is greater than the second assist level A24.

For example, in a case where the electronic controller 62 decreases the assist level A to the second assist level A2 and the gradient S is greater than or equal to the first gradient S1, the electronic controller 62 decreases the assist level A to the second assist level A23. In a case where the electronic controller 62 decreases the assist level A to the second assist level A2 and the gradient S is less than the first gradient S1, the electronic controller 62 decreases the assist level A to the second assist level A24.

A second modification of a process for changing the control state in which the electronic controller 62 controls the motor 40 will now be described with reference to FIGS. 4 and 6. For example, in a case where electric power is supplied to the electronic controller 62, the electronic controller 62 starts the process and proceeds to step S21 of the flowchart shown in FIG. 4. In a case where the flowchart shown in FIG. 4 ends, the electronic controller 62 repeats the process from step S21 after a predetermined interval, for example, until the supply of electric power stops.

Figure 6:
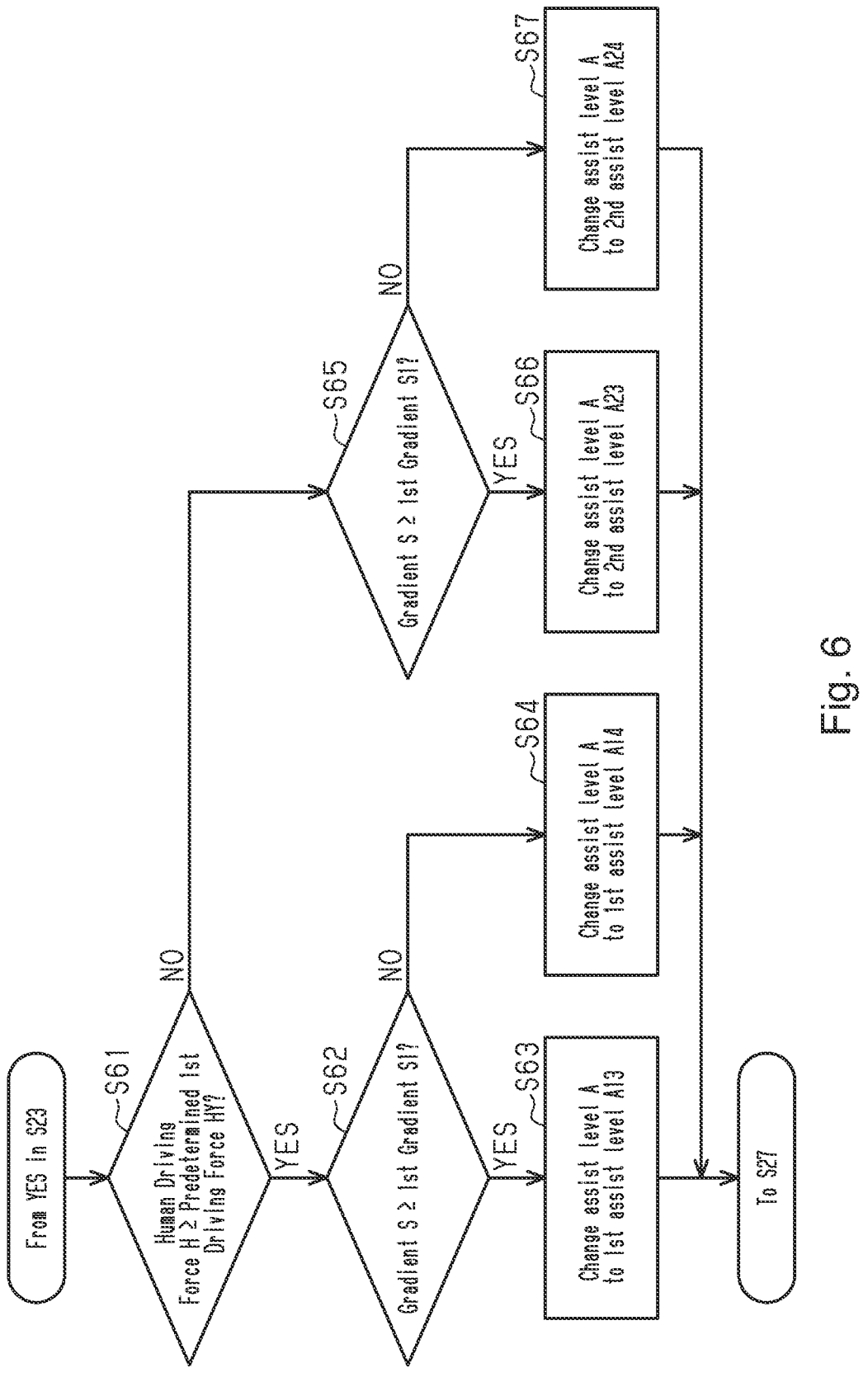
FIG. 6 is part of a flowchart of a process executed by the electronic controller shown in FIG. 2 for controlling the motor in a second modification.

In the second modification, the electronic controller 62 executes the same processes as shown in FIG. 4 except that the electronic controller 62 executes the process shown in FIG. 6 instead of steps S24, S25, and S26 shown in FIG. 4. The steps same as those in FIG. 4 will not be described.

In a case where the determination in step S23 is YES, the electronic controller 62 proceeds to step S61 shown in FIG. 6. In step S61, the electronic controller 62 determines whether the human driving force H is greater than or equal to the predetermined first driving force HY. In a case where the human driving force H is greater than or equal to the predetermined first driving force HY, the electronic controller 62 proceeds to step S62.

In step S62, the electronic controller 62 determines whether the gradient S is greater than or equal to the first gradient S1. In a case where the gradient S is greater than or equal to the first gradient S1, the electronic controller 62 proceeds to step S63. In step S63, the electronic controller 62 changes the assist level A to the first assist level A13 and then proceeds to step S27.

In step S62, in a case where the gradient S is not greater than or equal to the first gradient S1, the electronic controller 62 proceeds to step S64. In step S64, the electronic controller 62 changes the assist level A to the first assist level A14 and then proceeds to step S27.

In step S61, in a case where the human driving force H is not greater than or equal to the predetermined first driving force HY, the electronic controller 62 proceeds to step S65. In step S65, the electronic controller 62 determines whether the gradient S is greater than or equal to the first gradient S1. In a case where the gradient S is greater than or equal to the first gradient S1, the electronic controller 62 proceeds to step S66. In step S66, the electronic controller 62 changes the assist level A to the second assist level A23 and then proceeds to step S27.

In step S65, in a case where the gradient S is not greater than or equal to the first gradient S1, the electronic controller 62 proceeds to step S67. In step S67, the electronic controller 62 changes the assist level A to the second assist level A24 and then proceeds to step S27.

In a case where the electronic controller 62 decreases the assist level A, the electronic controller 62 can be configured to decrease the assist level A in accordance with a pitch angle D of the human-powered vehicle 10. In this case, preferably, the human-powered vehicle 10 includes a second inclination detector 54 that detects the pitch angle D.

The second inclination detector 54 is configured to detect the pitch angle D. The pitch angle D can be detected by an inclination angle of the human-powered vehicle 10 in the traveling direction. The second inclination detector 54 includes at least one of a gyro sensor and an acceleration sensor. The second inclination detector 54 is connected to the electronic controller 62 via a wireless communication device or an electric cable.

Preferably, the electronic controller 62 decreases the assist level A so that the assist level A is greater for a case where the human driving force H is the fourth human driving force H4 and the pitch angle D is greater than or equal to a first pitch angle D1 than the assist level A for a case where the human driving force H is the fourth human driving force H4 and the pitch angle D is less than the first pitch angle D1. The fourth human driving force H4 can be the same as or different from the predetermined first driving force HY. Preferably, the predetermined human driving force HX is less than the fourth human driving force H4.

In a case where the fourth human driving force H4 is the first human driving force H1 and the electronic controller 62 decreases the assist level A to the first assist level A1, the first assist level A1 varies in accordance with the pitch angle D. For example, the first assist level A1 includes a first assist level A15 for a case where the pitch angle D is greater than or equal to the first pitch angle D1 and a first assist level A16 for a case where the pitch angle D is less than the first pitch angle D1. The first assist level A15 is greater than the first assist level A16.

For example, in a case where the electronic controller 62 decreases the assist level A to the first assist level A1 and the pitch angle D is greater than or equal to the first pitch angle D1, the electronic controller 62 decreases the assist level A to the first assist level A15. In a case where the electronic controller 62 decreases the assist level A to the first assist level A1 and the pitch angle D is less than the first pitch angle D1, the electronic controller 62 decreases the assist level A to the first assist level A16.

In a case where the fourth human driving force H4 is the second human driving force H2 and the electronic controller 62 decreases the assist level A to the second assist level A2, the second assist level A2 varies in accordance with the pitch angle D. For example, the second assist level A2 includes a second assist level A25 for a case where the pitch angle D is greater than or equal to the first pitch angle D1 and a second assist level A26 for a case where the pitch angle D is less than the first pitch angle D1. The second assist level A25 is greater than the second assist level A26.

For example, in a case where the electronic controller 62 decreases the assist level A to the second assist level A2 and the pitch angle D is greater than or equal to the first pitch angle D1, the electronic controller 62 decreases the assist level A to the second assist level A25. In a case where the electronic controller 62 decreases the assist level A to the second assist level A2 and the pitch angle D is less than the first pitch angle D1, the electronic controller 62 decreases the assist level A to the second assist level A26. The second assist level A25 is greater than the second assist level A26.

A third modification of a process for changing the control state in which the electronic controller 62 controls the motor 40 will now be described with reference to FIGS. 4 and 7. For example, in a case where electric power is supplied to the electronic controller 62, the electronic controller 62 starts the process and proceeds to step S21 of the flowchart shown in FIG. 4. In a case where the flowchart shown in FIG. 4 ends, the electronic controller 62 repeats the process from step S21 after a predetermined interval, for example, until the supply of electric power stops.

Figure 7:
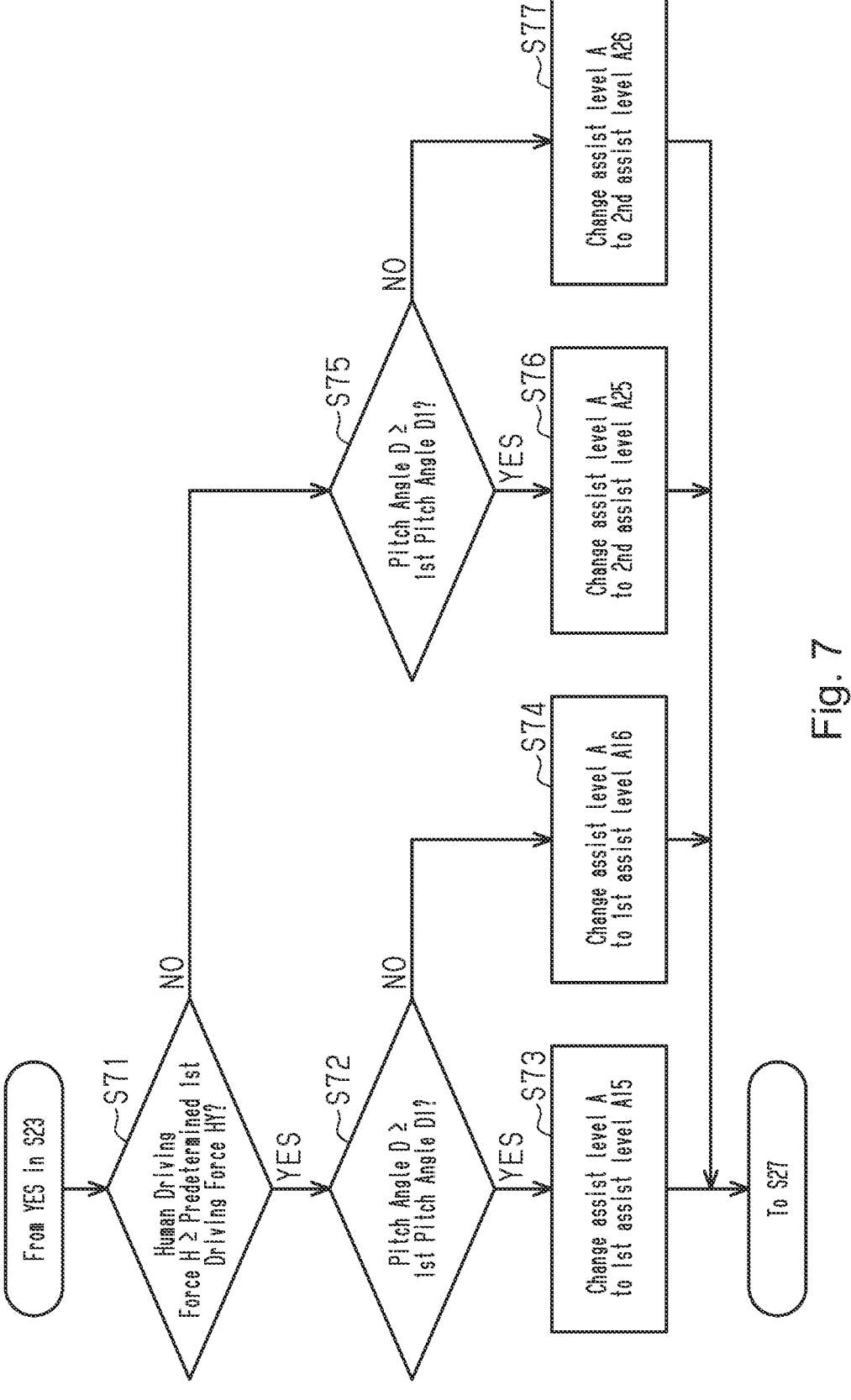
FIG. 7 is part of a flowchart of a process executed by the electronic controller shown in FIG. 2 for controlling the motor in a third modification.

In the third modification, the electronic controller 62 executes the same processes as shown in FIG. 4 except that the electronic controller 62 executes the process shown in FIG. 7 instead of steps S24, S25, and S26 shown in FIG. 4. The steps same as those in FIG. 4 will not be described.

In a case where the determination in step S23 is YES, the electronic controller 62 proceeds to step S71 shown in FIG. 7. In step S71, the electronic controller 62 determines whether the human driving force H is greater than or equal to the predetermined first driving force HY. In a case where the human driving force H is greater than or equal to the predetermined first driving force HY, the electronic controller 62 proceeds to step S72.

In step S72, the electronic controller 62 determines whether the pitch angle D is greater than or equal to the first pitch angle D1. In a case where the pitch angle D is greater than or equal to the first pitch angle D1, the electronic controller 62 proceeds to step S73. In step S73, the electronic controller 62 changes the assist level A to the first assist level A15 and then proceeds to step S27.

In step S72, in a case where the pitch angle D is not greater than or equal to the first pitch angle D1, the electronic controller 62 proceeds to step S74. In step S74, the electronic controller 62 changes the assist level A to the first assist level A16 and then proceeds to step S27.

In step S71, in a case where the human driving force H is not greater than or equal to the predetermined first driving force HY, the electronic controller 62 proceeds to step S75. In step S75, the electronic controller 62 determines whether the pitch angle D is greater than or equal to the first pitch angle D1. In a case where the pitch angle D is greater than or equal to the first pitch angle D1, the electronic controller 62 proceeds to step S76. In step S76, the electronic controller 62 changes the assist level A to the second assist level A25 and then proceeds to step S27.

In step S75, in a case where the pitch angle D is not greater than or equal to the first pitch angle D1, the electronic controller 62 proceeds to step S77. In step S77, the electronic controller 62 changes the assist level A to the second assist level A26 and then proceeds to step S27.

The electronic controller 62 can be configured to decrease the assist level A in accordance with two or more of the transmission ratio R, the gradient S, and the pitch angle D in addition to the human driving force H. In a case where the electronic controller 62 decreases the assist level A in accordance with two or more of the transmission ratio R, the gradient S, and the pitch angle D in addition to the human driving force H, for example, the electronic controller 62 can be configured to calculate an assist level A corresponding to each of the two or more of the transmission ratio R, the gradient S, and the pitch angle D and select the smallest assist level A from the calculated assist levels A.

In a case where the electronic controller 62 decreases the assist level A in accordance with two or more of the transmission ratio R, the gradient S, and the pitch angle D in addition to the human driving force H, the electronic controller 62 can be configured to decrease the assist level A in accordance with information related to an assist level A associated in advance with the human driving force H and the two or more of the transmission ratio R, the gradient S, and the pitch angle D. The information related to an assist level A associated with the human driving force H and the two or more of the transmission ratio R, the gradient S, and the pitch angle D is stored in the storage 64 in advance. The information related to an assist level A associated with the human driving force H and the two or more of the transmission ratio R, the gradient S, and the pitch angle D includes, for example, a table.

A fourth modification of a process for changing the control state in which the electronic controller 62 controls the motor 40 will now be described with reference to FIGS. 4, 8, and 9. For example, in a case where electric power is supplied to the electronic controller 62, the electronic controller 62 starts the process and proceeds to step S21 of the flowchart shown in FIG. 4. In a case where the flowchart shown in FIG. 4 ends, the electronic controller 62 repeats the process from step S21 after a predetermined interval, for example, until the supply of electric power stops.

Figure 8:
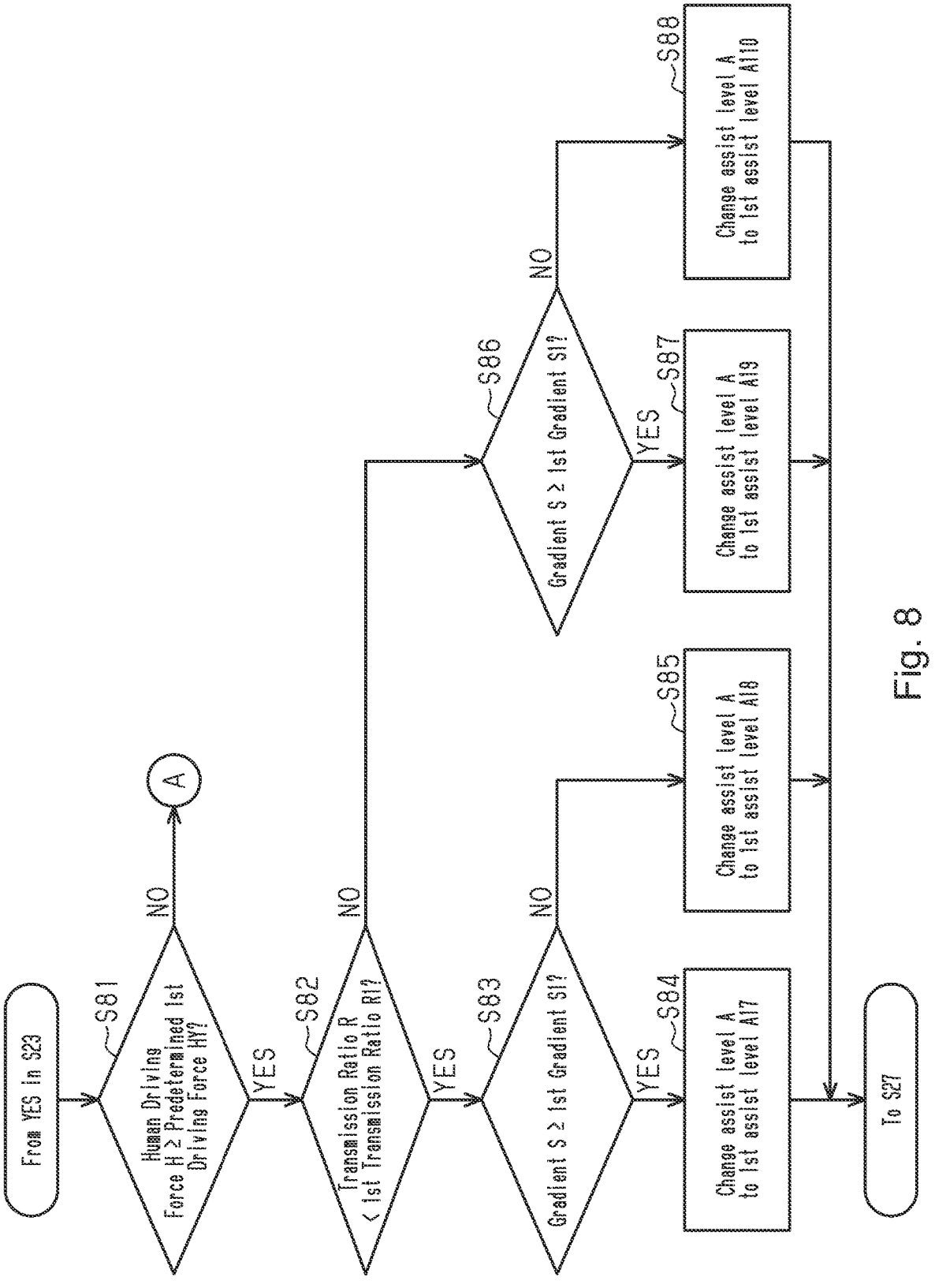
FIG. 8 is part of a flowchart of a process executed by the electronic controller shown in FIG. 2 for controlling the motor in a fourth modification.
Figure 9:
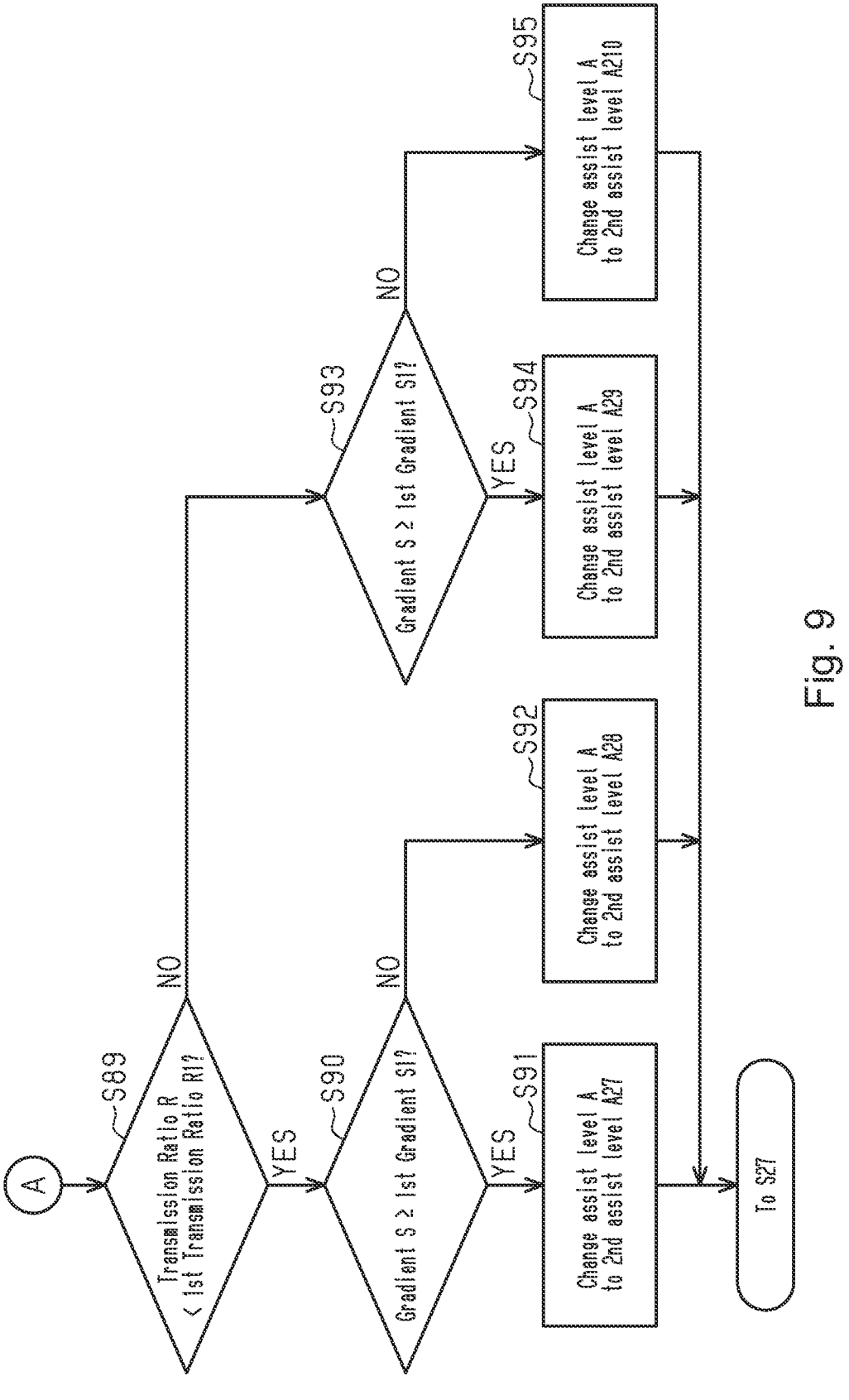
FIG. 9 is part of a flowchart of a process executed by the electronic controller shown in FIG. 2 for controlling the motor in the fourth modification.

In the fourth modification, the electronic controller 62 executes the same processes as shown in FIG. 4 except that the electronic controller 62 executes the processes shown in FIGS. 8 and 9 instead of steps S24, S25, and S26 shown in FIG. 4. The steps same as those in FIG. 4 will not be described.

In a case where the determination in step S23 is YES, the electronic controller 62 proceeds to step S81 shown in FIG. 8. In step S81, the electronic controller 62 determines whether the human driving force H is greater than or equal to the predetermined first driving force HY. In a case where the human driving force H is greater than or equal to the predetermined first driving force HY, the electronic controller 62 proceeds to step S82.

In step S82, the electronic controller 62 determines whether the transmission ratio R is less than the first transmission ratio R1. In a case where the transmission ratio R is less than the first transmission ratio R1, the electronic controller 62 proceeds to step S83. In step S83, the electronic controller 62 determines whether the gradient S is greater than or equal to the first gradient S1. In a case where the gradient S is greater than or equal to the first gradient S1, the electronic controller 62 proceeds to step S84. In step S84, the electronic controller 62 changes the assist level A to the first assist level A17 and then proceeds to step S27.

In step S83, in a case where the gradient S is not greater than or equal to the first gradient S1, the electronic controller 62 proceeds to step S85. In step S85, the electronic controller 62 changes the assist level A to the first assist level A18 and then proceeds to step S27.

In step S82, in a case where the transmission ratio R is not less than the first transmission ratio R1, the electronic controller 62 proceeds to step S86. In step S86, the electronic controller 62 determines whether the gradient S is greater than or equal to the first gradient S1. In a case where the gradient S is greater than or equal to the first gradient S1, the electronic controller 62 proceeds to step S87. In step S87, the electronic controller 62 changes the assist level A to the first assist level A19 and then proceeds to step S27.

In step S86, in a case where the gradient S is not greater than or equal to the first gradient S1, the electronic controller 62 proceeds to step S88. In step S88, the electronic controller 62 changes the assist level A to the first assist level A110 and then proceeds to step S27.

In step S81, in a case where the human driving force H is not greater than or equal to the predetermined first driving force HY, the electronic controller 62 proceeds to step S89.

In step S89, the electronic controller 62 determines whether the transmission ratio R is less than the first transmission ratio R1. In a case where the transmission ratio R is less than the first transmission ratio R1, the electronic controller 62 proceeds to step S90. In step S90, the electronic controller 62 determines whether the gradient S is greater than or equal to the first gradient S1. In a case where the gradient S is greater than or equal to the first gradient S1, the electronic controller 62 proceeds to step S91. In step S91, the electronic controller 62 changes the assist level A to the second assist level A27 and then proceeds to step S27.

In step S90, in a case where the gradient S is not greater than or equal to the first gradient S1, the electronic controller 62 proceeds to step S92. In step S92, the electronic controller 62 changes the assist level A to the second assist level A28 and then proceeds to step S27.

In step S89, in a case where the transmission ratio R is not less than the first transmission ratio R1, the electronic controller 62 proceeds to step S93. In step S93, the electronic controller 62 determines whether the gradient S is greater than or equal to the first gradient S1. In a case where the gradient S is greater than or equal to the first gradient S1, the electronic controller 62 proceeds to step S94. In step S94, the electronic controller 62 changes the assist level A to the second assist level A29 and then proceeds to step S27.

In step S93, in a case where the gradient S is not greater than or equal to the first gradient S1, the electronic controller 62 proceeds to step S95. In step S95, the electronic controller 62 changes the assist level A to the second assist level A210 and then proceeds to step S27.

In the fourth modification shown FIGS. 4, 8, and 9, the electronic controller 62 can be configured to determine whether the pitch angle D is greater than or equal to the first pitch angle D1 instead of determining whether the gradient S is greater than or equal to the first gradient S1. In this case, a case where the electronic controller 62 determines that the gradient S is greater than or equal to the first gradient S1 is replaced with a case where the electronic controller 62 determines that the pitch angle D is greater than or equal to the first pitch angle D1.

Modifications

The description related to the above embodiments exemplifies, without any intention to limit, applicable forms of a control device for a human-powered vehicle according to the present disclosure. The control device for a human-powered vehicle according to the present disclosure can be applied to, for example, modifications of the embodiments that are described below and combinations of at least two of the modifications that do not contradict each other. In the modifications described hereinafter, same reference characters are given to those elements that are the same as the corresponding elements of the above embodiment. Such elements will not be described in detail.

In a case where the transmission ratio R of the transmission device 42 is changed, the electronic controller 62 can be configured to decrease the assist level A at least during a period in which the sprockets are rotated by a predetermined angle. In this case, the human-powered vehicle 10 includes a rotational phase detector 58 that detects a rotational phase of the sprockets 42B as indicated by broken lines in FIG. 2. The rotational phase detector 58 includes, for example, a magnetic reed forming a reed switch or a magnetic sensor such as a Hall element. The magnetic sensor is, for example, attached to one of the frame 18 and the sprockets 42B and configured to detect a magnet attached to the other one of the frame 18 and the sprockets 42B. The sprockets can be the first rotary body 24 or the second rotary body 26. The sprockets correspond to the derailleur configured to be actuated in a case where the transmission ratio of the transmission device 42 is changed. The electronic controller 62 executes, for example, step S31 shown in FIG. 10 instead of step S27 shown in FIG. 4. In a case where the electronic controller 62 executes step S25 shown in FIG. 10, the electronic controller 62 proceeds to step S31. In a case where the electronic controller 62 executes step S26 shown in FIG. 10, the electronic controller 62 proceeds to step S31. In step S31, the electronic controller 62 determines whether at least the sprockets 42B are rotated by a predetermined rotational angle. Information related to the predetermined rotational angle is stored in the storage 64. In a case where at least the sprockets 42B are rotated by the predetermined rotational angle, the electronic controller 62 proceeds to step S29. In a case where at least the sprockets 42B are not rotated by the predetermined rotational angle, the electronic controller 62 proceeds to step S28. At least one of the sprockets 42B has a shift facilitation region. The predetermined rotational angle is set in accordance with the shift facilitation region. For example, in a case where the sprocket includes two shift facilitation regions, the predetermined angle is greater than or equal to 180 degrees and less than or equal to 360 degrees. The predetermined rotational angle can be separately set for each of the sprockets 42B.

The electronic controller 62 can be configured to decrease the assist level A in accordance with the human driving force H input to the human-powered vehicle 10 in only one of a case where the transmission ratio R is increased and a case where the transmission ratio R is decreased. The electronic controller 62 executes, for example, step S41 shown in FIG. 11 instead of step S21 shown in FIG. 4. For example, in a case where electric power is supplied to the electronic controller 62, the electronic controller 62 starts the process and proceeds to step S41 of the flowchart shown in FIG. 11. In a case where the flowchart shown in FIG. 11 ends, the electronic controller 62 repeats the process from step S41 after a predetermined interval, for example, until the supply of electric power stops. In step S41, the electronic controller 62 determines whether the transmission ratio R is changed in one of an increasing direction and a decreasing direction. In a case where the transmission ratio R is not changed in the one of the increasing direction and the decreasing direction, the electronic controller 62 ends the process. In a case where the transmission ratio R is changed in the one of the increasing direction and the decreasing direction, the electronic controller 62 proceeds to step S23. The electronic controller 62 can be configured to change between a state in which the assist level A is decreased in accordance with the human driving force H input to the human-powered vehicle 10 in a case where the transmission ratio R is increased, and a state in which the assist level A is decreased in accordance with the human driving force H input to the human-powered vehicle 10 in a case where the transmission ratio R is decreased. For example, in a case where first setting information is stored in the storage 64, the electronic controller 62 decreases the assist level A in accordance with the human driving force H input to the human-powered vehicle 10 only in a case where the transmission ratio R is increased. For example, in a case where second setting information is stored in the storage 64, the electronic controller 62 decreases the assist level A in accordance with the human driving force H input to the human-powered vehicle 10 only in a case where the transmission ratio R is decreased. The first setting information and the second setting information can be changed using an external device such as a personal computer, a tablet computer, or a smartphone.

The transmission device 42 can be a manual transmission device 42. In this case, the process in the flowchart shown in FIG. 3 is omitted. In step S21 shown in FIG. 4, step S21 shown in FIG. 10, and step S41 shown in FIG. 11, the electronic controller 62 determines whether the transmission ratio R is changed based on movement of the derailleur 42A, movement of a Bowden cable, or an output of a sensor that detects an operating state of the shift operating device. The electronic controller 62 determines that the transmission ratio is changed, for example, in a case where movement of the derailleur 42A, movement of the Bowden cable, or an output of the sensor that detects the operating state of the shift operating device is changed.

The electronic controller 62 can be configured to change the assist level A for a case where the transmission ratio R of the transmission device 42 is changed in accordance with the traveling resistance of the human-powered vehicle 10 instead of or in addition to at least one of the gradient S and the pitch angle D. For example, the electronic controller 62 decreases the assist level A so that the assist level A is greater for a case where the human driving force H is a fifth human driving force H5 and the traveling resistance is greater than or equal to a first traveling resistance than the assist level A for a case where the human driving force H is the fifth human driving force H5 and the traveling resistance is less than the first traveling resistance. The fifth human driving force H5 can be the same as or different from the predetermined first driving force HY. Preferably, the fifth human driving force H5 is greater than the predetermined human driving force HX.

The electronic controller 62 can be configured to change the assist level A for a case where the transmission ratio R of the transmission device 42 is changed in accordance with acceleration of the human-powered vehicle 10 instead of or in addition to at least one of the gradient S and the pitch angle D. For example, the electronic controller 62 decreases the assist level A so that the assist level A is greater for a case where the human driving force H is a sixth human driving force H6 and the acceleration is greater than or equal to a first acceleration than the assist level A for a case where the human driving force H is the sixth human driving force H6 and the acceleration is less than the first acceleration. The sixth human driving force H6 can be the same as or different from the predetermined first driving force HY. Preferably, the sixth human driving force H6 is greater than the predetermined human driving force HX.

The electronic controller 62 can be configured to control the motor 40 to decrease the decrease rate of the assist level A for a case where the human driving force H is greater than or equal to the predetermined first driving force HY and the transmission ratio R of the transmission device 42 is changed as the human driving force H increases. The electronic controller 62 can be configured to control the motor 40 to increase the decrease rate of the assist level A for a case where the human driving force H is less than the predetermined first driving force HY and the transmission ratio R of the transmission device 42 is changed as the human driving force H decreases. Tables 2 and 3 show other examples of the relationship between the human driving force H and the assist level A. Table 2 shows the decrease rate of the assist level A for a case where the assist level A is expressed as the ratio of an assist force of the motor 40 to the human driving force H and the human driving force H is expressed as torque. A seventh human driving force H7 is greater than the first human driving force H1. The electronic controller 62 can be configured not to decrease the assist level A in a case where the human driving force H is greater than or equal to an eighth human driving force H8 that is greater than the first human driving force H1. The eighth human driving force H8 is, for example, greater than the seventh human driving force H7. In Table 2, X11, X12, and X13 are numeral values where X11<X12<X13. For example, X11 is 10, X12 is 30, and X13 is 60.

TABLE 2

| | Human Driving Force H | Decrease Rate in Assist Level A |
|---|---|---|
| 8th Human Driving Force H8 | 100 Nm or greater | 0% |
| 7th Human Driving Force H7 | 70 Nm or greater and less than 100 Nm | X11% |

27 28

TABLE 2-continued

|  | Human Driving Force H | Decrease Rate in Assist Level A |
| --- | --- | --- |
| 1st Human Driving Force H1 | 30 Nm or greater and less than 70 Nm | X12% |
| 2nd Human Driving Force H2 | 5 Nm or greater and less than 30 Nm | X13% |
| <Predetermined Human Driving Force HX | Less than 5 Nm | 0% |

Table 3 shows an example of a time constant for a case where the assist level A is expressed as the restriction level L that restricts changes in output of the motor. In Table 3, T1, T2, and T3 are numeral values where T1>T2>T3.

TABLE 3

|  | Human Driving Force H | Time Constant |
| --- | --- | --- |
| 8th Human Driving Force H8 | 100 Nm or greater | No Change |
| 7th Human Driving Force H7 | 70 Nm or greater and less than 100 Nm | T1 ms |
| 1st Human Driving Force H1 | 30 Nm or greater and less than 70 Nm | T2 ms |
| 2nd Human Driving Force H2 | 5 Nm or greater and less than 30 Nm | T3 ms |
| <Predetermined Human Driving Force HX | Less than 5 Nm | No Change |

Figure 10:
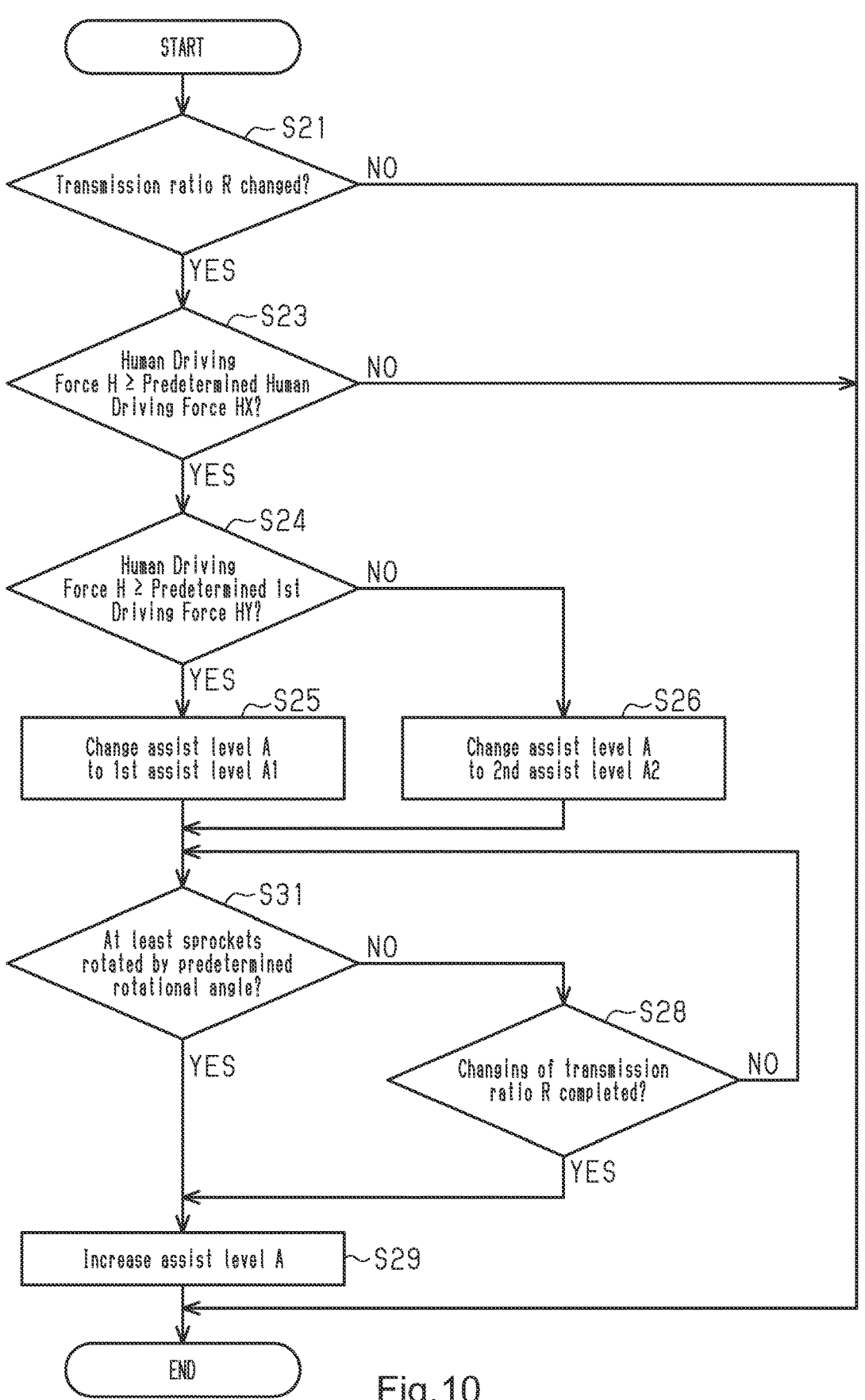
FIG. 10 is a flowchart of a process executed by a fifth modification of an electronic controller for controlling the motor.
Figure 11:
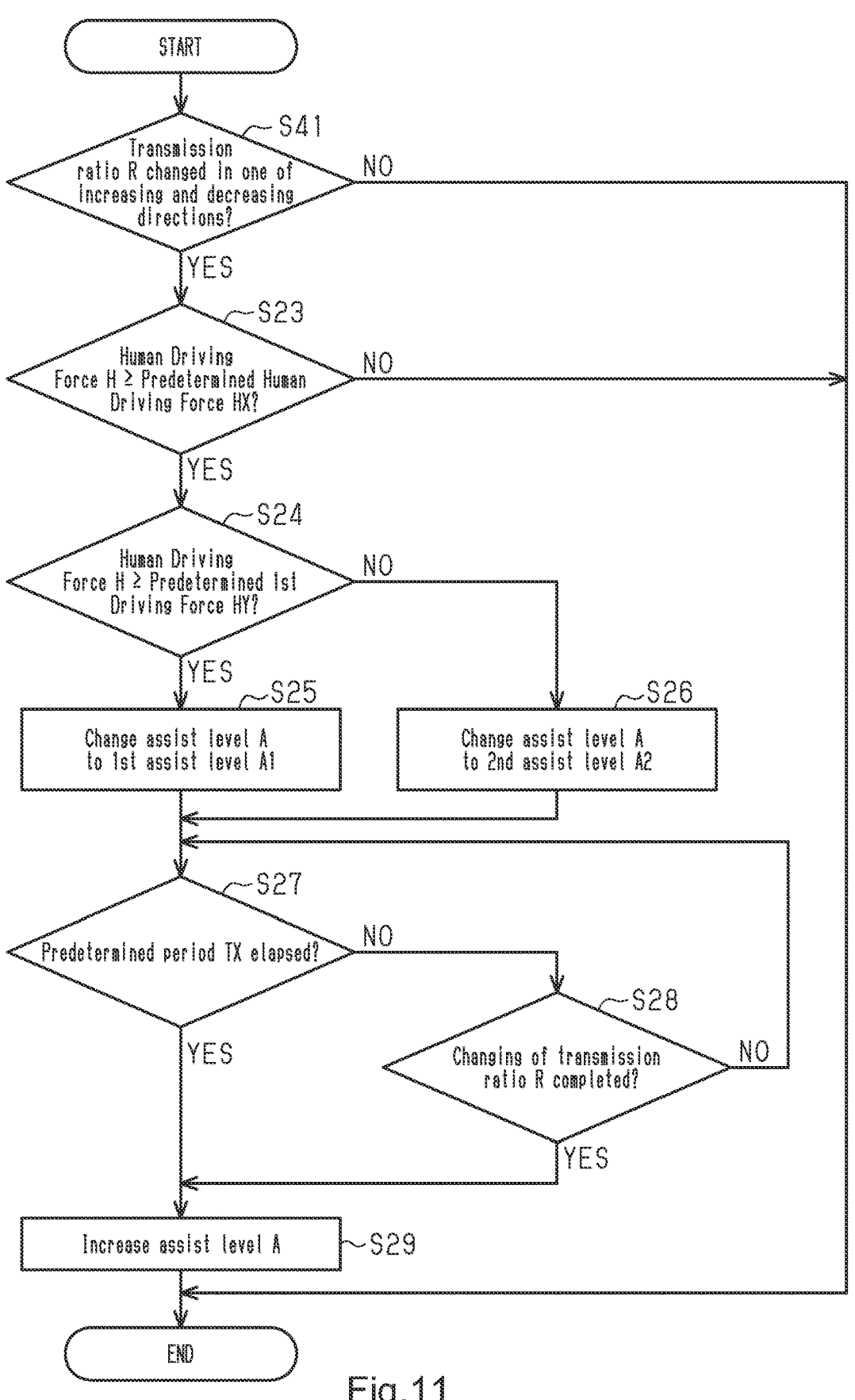
FIG. 11 is a flowchart of a process executed by a sixth modification of an electronic controller for controlling the motor.

The electronic controller 62 can omit step S23 from FIGS. 4, 10, and 11. In this case, in a case where the determination in step S21 is YES, the electronic controller 62 proceeds to step S24.

The electronic controller 62 can omit step S27 from FIGS. 4 and 11. In this case, in a case where the electronic controller 62 executes step S25, the electronic controller 62 can proceed to step S28.

The electronic controller 62 can omit step S28 from FIGS. 4, 10, and 11. In this case, in a case where the determination of step S27 in FIG. 4 or 11 is NO, the electronic controller 62 again executes step S27. In a case where the determination of step S31 in FIG. 10 is NO, the electronic controller 62 again executes step S31.

The predetermined period TX can be a time until a predetermined time elapses since the assist level A is decreased.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A control device for a human-powered vehicle, the control device comprising:

an electronic controller configured to control a motor that applies a propulsion force to the human-powered vehicle, the human-powered vehicle including the motor and a transmission device for assisting a human driving force, the electronic controller being configured to assist in propulsion of the human-powered vehicle with the motor in a state in which the human-powered vehicle is propelled by the human driving force, and in response to determining that a transmission ratio of the transmission device is changed, the electronic controller being configured to decrease an assist level of the motor in accordance with the human driving force input to the human-powered vehicle, and being configured to control the motor so that the assist level is greater for a case where the human driving force is a first human driving force than the assist level for a case where the human driving force is a second human driving force that is less than the first human driving force, and the electronic controller being configured to maintain the assist level in a case where the transmission ratio of the transmission device is changed and the human driving force is less than a predetermined human driving force.

2. The control device according to claim 1, wherein the assist level includes a ratio of an assist force of the motor to the human driving force.

3. The control device according to claim 1, wherein the assist level includes a restriction level that restricts changes in an output of the motor in a case where the output of the motor decreases.

4. The control device according to claim 1, wherein the electronic controller is configured to increase the assist level in a case where a predetermined period elapses after the assist level has decreased.

5. The control device according to claim 1, wherein the electronic controller is configured to increase the assist level upon completion of the transmission ratio being changed.

6. The control device according to claim 1, wherein in a case where the electronic controller decreases the assist level, the electronic controller is configured to decrease the assist level in accordance with the transmission ratio.

7. The control device according to claim 1, wherein in a case where the electronic controller decreases the assist level, the electronic controller is configured to decrease the assist level in accordance with a gradient of a road on which the human-powered vehicle is traveling.

8. The control device according to claim 1, wherein in a case where the electronic controller decreases the assist level, the electronic controller is configured to decrease the assist level in accordance with a pitch angle of the human-powered vehicle.

9. The control device according to claim 1, wherein in a case where the electronic controller decreases the assist level, the electronic controller is configured to gradually decrease the assist level.

10. The control device according to claim 1, wherein the human-powered vehicle includes a crank to which human driving force is input, and in a case where the transmission ratio of the transmission device is changed, the electronic controller is configured to start a process for decreasing the assist level in a case where an angle of the crank is in a predetermined range.

11. The control device according to claim 1, wherein the transmission device includes a derailleur and sprockets aligned along a rotation axis, and in a case where the transmission ratio of the transmission device is changed, the electronic controller is configured to decrease the assist level at least during a period in which the sprockets are rotated by a predetermined angle.

12. The control device according to claim 1, wherein
in a case where the electronic controller decreases the
assist level of the motor, the electronic controller is
configured to start a process for decreasing the assist
level of the motor in accordance with a state of a
shifting action of the transmission device.

13. The control device according to claim 1, wherein
the electronic controller is configured to decrease the
assist level in accordance with the human driving force
input to the human-powered vehicle in only one of a
case where the transmission ratio is increased and a
case where the transmission ratio is decreased.

14. The control device according to claim 1, wherein
in a case where the electronic controller controls the
transmission device to change the transmission ratio of
the transmission device, the electronic controller is
configured to start a shifting action with the transmis-
sion device in a case where the human driving force
decreases.

15. A control device for a human-powered vehicle, the
control device comprising:
an electronic controller configured to control a motor that
applies a propulsion force to the human-powered
vehicle,
the human-powered vehicle including the motor and a
transmission device for assisting a human driving
force,
the electronic controller being configured to assist in
propulsion of the human-powered vehicle with the
motor in a state in which the human-powered vehicle is
propelled by the human driving force, and
in response to determining that a transmission ratio of the
transmission device is changed, the electronic control-
ler being configured to decrease an assist level of the
motor in accordance with the human driving force input
to the human-powered vehicle, and being configured to
control the motor so that the assist level is greater for
a case where the human driving force is a first human
driving force than the assist level for a case where the
human driving force is a second human driving force
that is less than the first human driving force, and
the electronic controller being configured to increase the
assist level in a case where a predetermined period
elapses after the assist level has decreased,
the predetermined period includes a period during which
a rotation amount of a wheel of the human-powered
vehicle becomes a predetermined rotation amount, and
the predetermined rotation amount is greater than or equal
to 30 degrees and less than 460 degrees.

16. A control device for a human-powered vehicle the
control device comprising:
an electronic controller configured to control a motor that
applies a propulsion force to the human-powered
vehicle,
the human-powered vehicle including the motor and a
transmission device for assisting a human driving
force,
the electronic controller being configured to assist in
propulsion of the human-powered vehicle with the
motor in a state in which the human-powered vehicle is
propelled by the human driving force, and
in response to determining that a transmission ratio of the
transmission device is changed, the electronic control-
ler being configured to decrease an assist level of the
motor in accordance with the human driving force input
to the human-powered vehicle, and being configured to
control the motor so that the assist level is greater for a case where the human driving force is a first human
driving force than the assist level for a case where the
human driving force is a second human driving force
that is less than the first human driving force, and
in a case where the electronic controller decreases the
assist level, the electronic controller being configured
to decrease the assist level in accordance with the
transmission ratio, the electronic controller being con-
figured to decrease the assist level so that the assist
level is greater for a case where the human driving
force is a third human driving force and the transmis-
sion ratio is less than a first transmission ratio than the
assist level for a case where the human driving force is
the third human driving force and the transmission ratio
is greater than or equal to the first transmission ratio.

17. The control device according to claim 16, wherein
the electronic controller is configured to maintain the
assist level in a case where the transmission ratio of the
transmission device is changed and the human driving
force is less than a predetermined human driving force.

18. A control device for a human-powered vehicle, the
control device comprising:
an electronic controller configured to control a motor that
applies a propulsion force to the human-powered
vehicle,
the human-powered vehicle including the motor and a
transmission device for assisting a human driving
force,
the electronic controller being configured to assist in
propulsion of the human-powered vehicle with the
motor in a state in which the human-powered vehicle is
propelled by the human driving force, and
in response to determining that a transmission ratio of the
transmission device is changed, the electronic control-
ler being configured to decrease an assist level of the
motor in accordance with the human driving force input
to the human-powered vehicle, and being configured to
control the motor so that the assist level is greater for
a case where the human driving force is a first human
driving force than the assist level for a case where the
human driving force is a second human driving force
that is less than the first human driving force, and
in a case where the electronic controller decreases the
assist level, the electronic controller being configured
to decrease the assist level in accordance with a gra-
dient of a road on which the human-powered vehicle is
traveling, the electronic controller being configured to
decrease the assist level so that the assist level is greater
for a case where the human driving force is a fourth
human driving force and the gradient is greater than or
equal to a first gradient than the assist level for a case
where the human driving force is the fourth human
driving force and the gradient is less than the first
gradient.

19. A control device for a human-powered vehicle the
control device comprising:
an electronic controller configured to control a motor that
applies a propulsion force to the human-powered
vehicle,
the human-powered vehicle including the motor and a
transmission device for assisting a human driving
force,
the electronic controller being configured to assist in
propulsion of the human-powered vehicle with the
motor in a state in which the human-powered vehicle is
propelled by the human driving force, and in response to determining that a transmission ratio of the
transmission device is changed, the electronic control-
ler being configured to decrease an assist level of the
motor in accordance with the human driving force input
to the human-powered vehicle, and being configured to
control the motor so that the assist level is greater for
a case where the human driving force is a first human
driving force than the assist level for a case where the
human driving force is a second human driving force
that is less than the first human driving force, and
in a case where the electronic controller decreases the
assist level, the electronic controller being configured
to decrease the assist level in accordance with a pitch
angle of the human-powered vehicle, the electronic
controller being configured to decrease the assist level
so that the assist level is greater for a case where the
human driving force is a fourth human driving force
and the pitch angle is greater than or equal to a first
pitch angle than the assist level for a case where the
human driving force is the fourth human driving force
and the pitch angle is less than the first pitch angle.

\* \* \* \* \*